(12) United States Patent
Ota et al.

(10) Patent No.: US 11,751,580 B2
(45) Date of Patent: Sep. 12, 2023

(54) INGREDIENT FREEZING SYSTEM AND METHOD FOR PRODUCING FROZEN INGREDIENT

(71) Applicant: HAKUBAI Co., Ltd., Okayama (JP)

(72) Inventors: Ikuo Ota, Okayama (JP); Yoshiyuki Ota, Okayama (JP)

(73) Assignee: HAKUBAI Co., Ltd., Okayama (JP)

( * ) Notice: Subject to any disclaimer, the term of this patent is extended or adjusted under 35 U.S.C. 154(b) by 145 days.

(21) Appl. No.: 17/422,894

(22) PCT Filed: Jan. 15, 2020

(86) PCT No.: PCT/JP2020/001062
§ 371 (c)(1),
(2) Date: Jul. 14, 2021

(87) PCT Pub. No.: WO2020/149300
PCT Pub. Date: Jul. 23, 2020

(65) Prior Publication Data
US 2022/0061342 A1   Mar. 3, 2022

(30) Foreign Application Priority Data
Jan. 15, 2019   (JP) .................................. 2019-004434

(51) Int. Cl.
*A23B 4/06* (2006.01)
*A23B 7/04* (2006.01)
(Continued)

(52) U.S. Cl.
CPC ............ *A23B 4/062* (2013.01); *A23B 7/0408* (2013.01); *A23B 7/06* (2013.01); *F25D 13/06* (2013.01)

(58) Field of Classification Search
CPC ......... A23B 4/062; A23B 7/0408; A23B 7/06; F25D 13/06; F25D 31/005;
(Continued)

(56) References Cited

U.S. PATENT DOCUMENTS

| 2,237,255 A | 4/1941 | Finnegan |
| 10,561,154 B2 | 2/2020 | Ota et al. |
| 2018/0064122 A1 | 3/2018 | Ota et al. |

FOREIGN PATENT DOCUMENTS

| AU | 2016234867 A1 * 10/2017 | ............. A23B 4/005 |
| GB | 1182347 | 2/1970 |

(Continued)

OTHER PUBLICATIONS

International Search Report for related International Application No. PCT/JP2020/001062 dated Mar. 10, 2020 and its English Translation.

(Continued)

*Primary Examiner* — Emmanuel E Duke
(74) *Attorney, Agent, or Firm* — Renner, Otto, Boisselle & Sklar, LLP

(57) ABSTRACT

The present invention addresses the problem of providing a novel freezing system and a method for producing frozen ingredients, the system and method being such that the amount of free water after defrosting of the frozen ingredients is lower than with conventional freezing. The present invention solves the above problem by providing an ingredient freezing system comprising two or more freezing units for freezing the ingredient, and a transport unit for transporting the ingredient to the two or more freezing units, the two or more freezing units being configured so as to freeze the ingredient in stages so that the ingredient is frozen at progressively lower temperatures as the ingredient is transported on the transport unit.

16 Claims, 15 Drawing Sheets

(51) Int. Cl.
*A23B 7/06* (2006.01)
*F25D 13/06* (2006.01)

(58) Field of Classification Search
CPC .... F25D 2500/02; F25D 13/067; A23L 3/361; A23L 19/00; A23L 3/36; A23V 2002/00; A23V 2300/20
See application file for complete search history.

(56) References Cited

FOREIGN PATENT DOCUMENTS

| | | | | | |
|---|---|---|---|---|---|
| GB | 1524317 | | 9/1978 | | |
| JP | H5-53491 | | 7/1993 | | |
| JP | 2008128606 | A | 6/2008 | | |
| JP | 2008128606 | A * | 6/2008 | | |
| JP | 200919851 | A | 1/2009 | | |
| JP | 2009019851 | A * | 1/2009 | | |
| JP | 2010210109 | A * | 9/2010 | | |
| JP | 2010210109 | A | 9/2010 | | |
| JP | 2015065831 | A * | 4/2015 | ............. | A23B 4/062 |
| JP | 2015230124 | A * | 12/2015 | | |
| JP | 2015230124 | A | 12/2015 | | |
| JP | 6010240 | | 10/2016 | | |
| JP | 201945102 | A | 3/2019 | | |
| KR | 20180088154 | A * | 8/2018 | ............. | F25D 17/00 |
| WO | 2009151191 | A1 | 12/2009 | | |
| WO | WO-2014199940 | A1 * | 12/2014 | ............... | A23L 5/12 |
| WO | 2016147626 | A1 | 9/2016 | | |

OTHER PUBLICATIONS

Extended European Search Report (EESR), including the supplementary European Search Report and European Search Opinion for corresponding European Application No. 20741721.3, dated Dec. 22, 2022.
First Office Action for corresponding Indonesian Application No. P00202106273 dated Feb. 20, 2023, and its English translation.
Written Opinion for corresponding Singaporean Application No. 11202107694R dated Mar. 9, 2023.
Communication pursuant to Rule 164(1) EPC, including the partial supplementary European Search Report and provisional opinion accompanying the partial search result for corresponding European Application No. 20741721.3 dated Sep. 21, 2022.
First Office Action for corresponding Canadian Application No. 3,126,380 dated May 23, 2023.

* cited by examiner (a)

Direction of transport (b)

INGREDIENT FREEZING SYSTEM AND METHOD FOR PRODUCING FROZEN INGREDIENT

TECHNICAL FIELD

The present invention relates to a food freezing system and a method of producing frozen food.

BACKGROUND ART

The inventors invented a food processing system that integrates heating in an intermediate temperature zone and cooling (see, for example, Patent Literature 1). This integrated food processing system can remove harshness in taste without destroying the cells of food, inactivate enzymes in food to prevent a change in the food from aging, and achieve elimination of microorganisms for sanitary management of food items by heating in the intermediate temperature zone. Furthermore, subsequent rapid cooling can maintain the effect of sterilization from heating by cooling food to the chilled temperature zone (about 2° C.). This enables sterilized food, which has excellent mouthfeel and quality of taste as well as excellent preservability, to be provided.

Demand for frozen food that can be stored for a long period of time has increased in recent years.

CITATION LIST

Patent Literature

[PTL 1] Japanese Patent No. 6010240

SUMMARY OF INVENTION

Technical Problem

However, frozen food suffers from outflow of a liquid within food (syneresis) after thawing. Syneresis results in degraded taste and mouthfeel and outflow of nutrients in the food. Thus, the problem to be solved by the present invention is to provide a novel freezing system that reduces syneresis from frozen food after thawing in comparison to conventional freezing, and a method of producing frozen food.

Solution to Problem

The inventors have developed a novel food freezing system that reduces syneresis from frozen food after thawing as a result of diligent research in view of the aforementioned problem. The food freezing system of the invention can cool food to about −60° C. to about −90° C., and preferably to −60° C. to −89° C. in a short period of time (e.g., within about 6 minutes). Frozen food items cooled to a temperature below −60° C. within such a short period of time can have fewer cells or tissues destroyed after thawing and less outflow of a liquid (syneresis) from food.

In one aspect, the food freezing system of the invention comprises at least two freezing regions and is capable of freezing food efficiency with reduced tissue destruction in the food.

The food freezing system of the invention can also be advantageous in being a simple system requiring only simple steps and being capable of enabling long term storage of food without impairing the flavor or outer appearance of the food efficiently without using a special agent or expensive equipment.

Since food sterilized by the integrated food processing system described in Japanese Patent No. 6010240 is in a better condition than food that is sterilized by other methods and already in a compromised condition, the effect of cell destruction, seepage (dripping), and reduced quality due to freezing would be reflected notably in food. For this reason, freezing according to the freezing system of the invention is preferably freezing of food that has been sterilized with an integrated food processing system.

For example, the present invention provides the following.

(Item 1)
A food freezing system for freezing food, the food freezing system comprising:
 freezing units for freezing the food; and
 a transporting unit for transporting the food to the two or more freezing units;
 wherein the freezing units are configured to cool the food with cold air of about −60° C. to about −90° C.

(Item 2)
The freezing system according to item 1, wherein the freezing units are configured to blow cold air of about −60° C. to −89° C.

(Item 3)
The freezing system according to item 1 or 2, further comprising a precooling unit for cooling food prior to freezing the food,
 wherein the transporting unit transports the food to the precooling unit and then to the freezing units in order.

(Item 4)
The freezing system according to item 3, wherein the precooling unit comprises at least a first precooling unit and a second precooling unit in order of transport of the food, wherein the first precooling unit and the second precooling unit are configured to be cooled with cold air of different temperatures.

(Item 5)
The freezing system according to item 3, wherein the precooling unit comprises at least a first precooling unit, a second precooling unit, and a third precooling unit in order of transport of the food, wherein the first precooling unit and the second precooling unit are configured to be cooled with cold air of different temperatures, and the second precooling unit and the third precooling unit are configured to be cooled with cold air of different temperatures.

(Item 6)
The freezing system according to item 5, wherein the third precooling unit is configured to be cooled with cold air of about −25° C. to about −45° C.

(Item 7)
The freezing system according to any one of items 4 to 6, wherein the first precooling unit is configured to be cooled with cold air of about −25° C. to about −45° C.

(Item 8)
The freezing system according to any one of items 4 to 7, wherein the second precooling unit is configured to be cooled with cold air of about −60° C. to about −90° C.

(Item 9)
The freezing system according to item 5, wherein cold air in the second precooling unit has a lower temperature than cold air in the first precooling unit and the third precooling unit.

(Item 10)

The food freezing system according to any one of items 4 to 9, wherein the food freezing system further comprises at least one air curtain generating mechanism for generating an air curtain between adjacent precooling units.

(Item 11)

The freezing system according to any one of items 1 to 10, wherein the freezing units comprise a plurality of air blowing vents for blowing cold air toward the transporting unit along a direction of transport of the transporting unit, and an orientation of the air blowing vents is configured to be an orientation against the direction of transport of the transporting unit.

(Item 12)

The food freezing system according to item 11, wherein the orientation of the air blowing vents is against the direction of transport of the transporting unit and is tilted at an angle of about 30° to about 60°.

(Item 13)

The food freezing system according to item 11 or 12, wherein the air blowing vents are provided at a lower portion of the transporting unit.

(Item 14)

The food freezing system according to item 13, wherein the air blowing vents are provided at both an upper portion and a lower portion of the transporting unit.

(Item 15)

The food freezing system according to item 14, wherein
the air blowing vent at the upper portion is provided so as to be tilted with respect to a direction that is orthogonal to the direction of transport of the transporting unit, and
the air blowing vent at the lower portion is provided so as to intersect a tilt of the air blowing vent at the upper portion.

(Item 16)

The food freezing system according to item 15, wherein orientations of tilts of the air blowing vents are configured to alternate along the direction of transport of the transporting unit.

(Item 17)

The food freezing system according to any one of items 1 to 16, wherein the transporting unit is configured to transport the food so that the food passes through the freezing units within about 6 minutes from entering the food freezing system.

(Item 18)

A food processing system, comprising:
(1) a heating unit comprising a heating mechanism for indirectly heating food; and
(2) the food freezing system according to any one of items 1 to 6;
wherein the transporting unit transports the food through the heating unit and the food freezing system.

(Item 19)

The food processing system according to item 18, wherein the heating mechanism is present only below the transporting unit and is configured to release a heat mediating substance downward, and the heating unit comprises an air blowing mechanism configured to blow air in a direction that is not toward the transporting unit.

(Item 20)

The food processing system according to item 19, wherein the heating unit comprises a temperature sensor in the vicinity of the transporting unit, and the heating mechanism is intermittently driven by the temperature sensor.

(Item 21)

A method of producing frozen food, comprising a processing step for freezing food using the food freezing system according to any one of items 1 to 17 or the food processing system according to any one of items 18 to 20.

(Item 22)

The method of producing according to item 21, wherein the food is cut vegetables.

Advantageous Effects of Invention

The present invention provides a food freezing system resulting in reduced syneresis after thawing compared to conventional frozen food, and a method of producing frozen food using such a food freezing system.

BRIEF DESCRIPTION OF DRAWINGS

FIG. 8(a) shows a front view, and FIG. 8(b) shows a partial enlarged view of FIG. 8(a).

FIG. 9(a) shows a top view, and FIG. 9(b) shows a partial enlarged view of FIG. 9(a).

FIG. 11(a) shows a front view, and FIG. 11(b) shows a top view.

DESCRIPTION OF EMBODIMENTS

Figure 1:
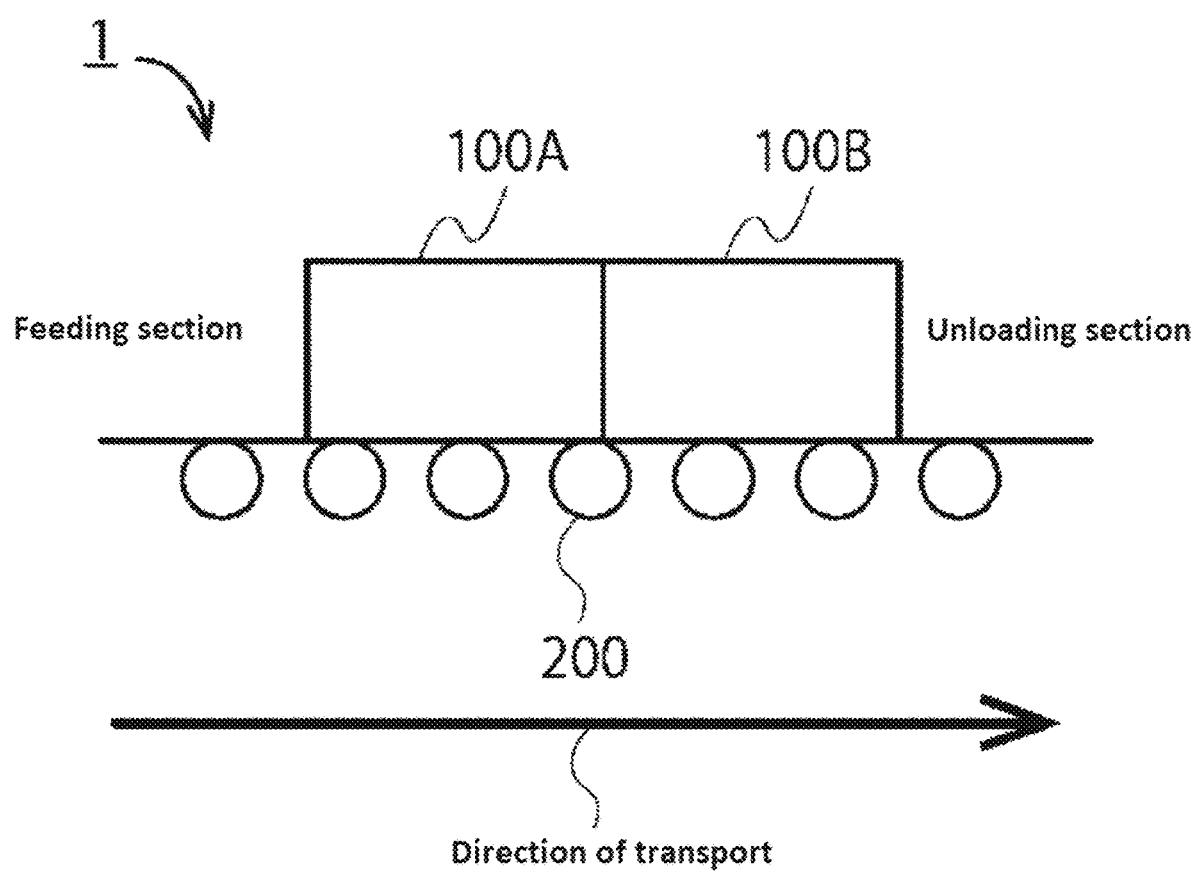
FIG. 1 shows an example of a configuration of the food freezing system of the invention.

The present invention is described hereinafter while disclosing the best mode thereof. Throughout the entire specification, a singular expression should be understood as encompassing the concept thereof in the plural form, unless specifically noted otherwise. Thus, singular articles (e.g., "a", "an", "the", and the like in the case of English) should also be understood as encompassing the concept thereof in the plural form, unless specifically noted otherwise. The terms used herein should also be understood as being used in the meaning that is commonly used in the art, unless specifically noted otherwise. Thus, unless defined otherwise, all terminologies and scientific technical terms that are used herein have the same meaning as the general understanding of those skilled in the art to which the present invention pertains. In case of a contradiction, the present specification (including the definitions) takes precedence.

The terms used herein are defined hereinafter.

As used herein, "food" refers to any object that can be consumed by humans. Food that has not been processed by heating at 90° C. or higher is especially referred to as "fresh food".

As used herein, "about" refers to a range of ±10% of the numerical value described thereafter.

As used herein, "intermediate temperature zone" refers to temperatures from 45° C. to 90° C.

As used herein, "indirect heating" refers to releasing of a heat mediating substance such as steam from a supplying unit so that the direction of movement of the heat mediating substance is altered before arriving at a subject to be heated from the supplying unit, when heating the subject to be heated by having the heat mediating substance make contact therewith.

As used herein, "direct heating" refers to releasing of a heat mediating substance such as steam from a supplying unit so that the direction of movement of the heat mediating substance is not altered before arriving at a subject to be heated from the supplying unit, when heating the subject to be heated by having the heat mediating substance make contact therewith.

As used herein, "direct cooling" refers to sending cold air toward a subject to be cooled with an air blowing mechanism such as a fan.

As used herein, "indirect cooling" refers to cooling without using an air blowing mechanism such as a fan other than a cooling mechanism, or sending cold air without directing the air to a subject to be cooled even if cold air is sent with an air blowing mechanism.

As used herein "vicinity of a transporting unit" refers to an area at or within about 30 cm from the transporting unit.

As used herein, "steam" refers to gas comprising water droplets.

As used herein, "sterilize" refers to the live common bacteria count being $10^5$ cfu/g (mL) or less in a test by a standard agar plate culture method, or *E. coli* being negative (less than 10 cfu/g (mL)) in a test by BGLG medium method, immediately after food processing.

As used herein, "integrated" refers to physical continuity between systems or elements with each other via a transport path.

As used herein, "downward" refers to a direction that forms a 0° to 90° angle with respect to the vertically downward direction.

As used herein, "quick-freezing" refers to freezing resulting in a temperature at the center of target food reaching −5° C. or lower in about 5 minutes.

Preferred embodiments of the present invention are described below. Embodiments described below are provided to facilitate the understanding of the present invention. It is understood that the scope of the present invention should not be limited to the following descriptions. Thus, it is apparent that those skilled in the art can make appropriate modifications within the scope of the present invention by referring to the descriptions herein. It is also understood that the following embodiments of the present invention can be used independently or as a combination thereof.

Throughout the entire specification, the same reference numbers are used for the same constituent elements.

(Freezing System)

The food freezing system of the invention is configured to cool (freeze) food to about −60° C. to about −90° C., preferably to −60° C. to −89° C. in a short period of time (e.g., within about 6 minutes). The food freezing system of the invention may be a system that freezes food in a single freezing unit, or a system comprising two or more freezing units comprising a precooling unit and a freezing unit. It is particularly preferable to provide a precooling unit for food with a large volume to be processed.

FIG. 1 shows an example of a configuration of the food freezing system of the invention.

In the example shown in FIG. 1, the food freezing system 1 of the invention comprises two freezing units, i.e., a first freezing unit 100A on the feeding section side and a second freezing unit 100B on the exit side, and a transporting unit 200. The freezing unit 100A on the feeding section side corresponds to a precooling unit. In the example shown in FIG. 1, the number of freezing units is two, but the present invention is not limited thereto. The number of freezing units can be one (i.e., does not comprise a precooling unit), or any integer that is two or greater. For example, freezing systems comprising three freezing units or four freezing units are also within the scope of the present invention.

In one embodiment, the temperature inside the second freezing unit 100B is lower than the temperature of the first freezing unit 100A. In one embodiment, the temperature of cold air for freezing food in the second freezing unit 100B is lower than the temperature of cold air for freezing food in the first freezing unit 100A. In a certain embodiment, the temperature of cold air in the first freezing unit 100A can be, for example, about −25° C. to −40° C., and the temperature of cold air in the second freezing unit 100B can be, for example, about −55° C. to about −60° C., about −60° C. to about −90° C., about −60° C. to about −80° C., about −60° C. to about −70° C., −60° C. to −89° C., −60° C. to −70° C., about −60° C., −60° C., or the like. Although not intending to be bound by any theory, freezing food at a temperature of −60° C. or lower is sufficient for inactivating an enzyme within the food, so that such a temperature is preferable for retaining quality of the food after thawing. A food freezing temperature higher than −90° C. is preferable because a change in the tissue structure of food is inhibited (e.g., freezing food to or below −90° C. can result in a structural change, such as twisting of tissue in the food).

In this manner, the system can be configured so that food undergoes a plurality of stages of freezing steps through a plurality of freezing units. A plurality of freezing units can also be configured to freeze food in stages so that the food is frozen at a lower temperature as the food is transported on the transporting unit 200. Such freezing in stages can avoid rapid changes in the food surface temperature due to freezing, and therefore freeze food in an energy efficient manner.

In a preferred embodiment, the first refrigerant of the first freezing unit 100A is different from the second refrigerant of the second freezing unit 100B. While both the first refrigerant and the second refrigerant can be a common refrigerant that is available in the art, the second refrigerant can have a better temperature conversion efficiency as compared to the first refrigerant.

In the freezing system of the invention, food is moved by a transporting unit continuously within a freezing unit and is discharged, without stagnating at a single location. The time it takes for food to pass through the freezing system 1 is about 6 minutes or less, preferably about 5 to about 6 minutes, and more preferably about 5 minutes. Swelling due to moisture contained in food freezing can be suppressed by quick-freezing without expending time in this manner, so that syneresis (component outflow) from food upon thawing and deterioration in quality resulting therefrom can be prevented. The time it takes for food to pass through the freezing system 1 can be appropriately adjusted by those skilled in the art depending on the thermal conductivity or size of the food. When freezing by the freezing system 1 is completed, the temperature up to the center part of the food can be about −5° C.

Processing with a single freezing unit may be inefficient for reducing the temperature at the center of food to −5° C. in about 6 minutes or less such as in about 5 minutes as described above, because the temperature of the surrounding space is an obstructing factor resulting in a significant decrease in the efficiency of heat exchange, which leads to an unnecessary need to and risk of cooling the residual space. Thus, a freezing system comprising at least two freezing units including a precooling unit can be preferable. Meanwhile, a freezing system comprising a single freezing unit can avoid a decrease in the efficiency of heat exchange in the present invention as described in detail below. Thus, the present invention is not limited to a freezing system comprising at least two freezing units.

(Transporting Unit)

The food freezing system 1 comprises the transporting unit 200 for transporting food through the first freezing unit 100A and the second freezing unit 100B on the exit side. The configuration of the transporting unit 200 is not particularly limited, as long as it has a function of continuously moving food.

It can be advantageous to freeze food while having the food move for uniformly processing a large quantity of food at a consistent temperature. For example, when food is processed at rest, there would be a difference in the processing temperature for each food due to variation in temperatures in the processing space. Meanwhile, processing while moving food along in the direction of transport of the food can eliminate the difference for each food due to variation in the temperature in the space.

The transporting unit 200 preferably transports food through the first freezing unit 100A and the second freezing unit 100B at a constant speed. In a certain embodiment, the transporting unit 200 has an adjusting mechanism for adjusting the constant speed. The adjusting mechanism may be capable of automatically adjusting the constant speed, adjusting the speed to a manually set speed, or both. This allows the transporting unit 200 to be configured to transport food such that the food passes through the inside of the first freezing unit 100A and/or the second freezing unit 100B for a desired period of time. In a certain embodiment, the transporting unit 200 is preferably a conveyor belt. In a certain embodiment, the transporting unit 200 has a through hole. For example, the transporting unit 200 with a through hole may be a meshed conveyor belt. A system may have multiple transporting unit 200. Multiple transporting units 200 in parallel can increase the amount of food processed per unit time to enhance the processing capability of the system of the invention. Food may be transported directly on the transporting unit 200 or transported by the transporting unit 200 in a container containing food. In such a case, a ventilated container is preferably used. A ventilated container is, for example, a container with a through hole on the bottom and/or side surface. Such a container can be, for example, a container comprising a ventilated meshed member on the bottom and/or side surface. Inclusion of a through hole and/or meshed member in the transporting unit 200 and/or container can cause heat to equally affect each food.

The food transporting speed is adjusted so that the time it takes for the food to pass through a freezing unit is about 6 minutes (preferably about 5 minutes) or less. If there is a slight difference depending on the mass or thermal penetration rate of food, the processing time during which the food passes through the freezing unit can be adjusted to not exceed about 6 minutes (preferably 5 minutes) by adjusting the cooling temperature of the freezing unit at the initial stage (e.g., first freezing unit). In some embodiments, the length of a freezing unit is about 6 m to about 12 m, and the freezing time is about 2 minutes to about 6 minutes, so that the transport speed is about 1 m to about 6 m per minute and can be freely set within this range. However, the range described above is merely a specific example. The present invention is not limited thereto. The optimal transport speed in accordance with the type or size of food can be determined so that the core temperature of the food decreases to a suitable temperature at a suitable temporal gradient.

In some embodiments, food is continuously moved to a feeding section, the first freezing unit 100A, the Second freezing unit 100B, and unloading section in this order by the transporting unit 200. The transporting unit 200 is preferably a conveyor belt. The speed of the transporting unit 200 can be automatically adjusted to a suitable value in accordance with the size of each piece of food placed at the feeding section, the shape of the food, freezing conditions of the first freezing unit 100A, or freezing conditions of the second freezing unit 100B.

Food that was initially frozen at the first cooling unit 100A is already processed to have a temperature of −3° C. to −3.5° C. at the center of the food unlike the initial freezing condition in common freezing. The swelling rate of moisture within the cell membrane can be suppressed without destroying the cell membrane of food within about 5 minutes by processing such food that is already processed to have a temperature of −3° C. to −3.5° C. at the center with cold air of, for example, −60° C. in the second cooling unit 100B for cooling at an even cooler temperature.

The shape of the freezing unit of the invention is typically, but is not limited to, a rectangle with transport of food in the horizontal direction. For example, the freezing unit may be a vertically moving unit having a first cooling unit on top and a second cooling unit on the bottom. In a vertically moving unit, food may be moved up and down vertically or in series, or moved vertically in parallel, for example, in a spiral.

In a representative embodiment, the distance from a feeding entrance to the exit is about 6 meters in a horizontal food freezing system, and the length of a first cooling unit and a second cooling unit can be about 3 meters each. The transport path can move food so that the food passes each cooling unit in about 2.5 minutes.

If the center temperature does not reach −5° C. by processing food for about 5 to 6 minutes in two cooling units due to the property of quantity of the food, a third cooling unit can be added. The length of the third cooling unit can be approximately the same as the length of the first cooling unit and the second cooling unit. For example, the first cooling unit to the third cooling unit can be about 3 m each, cold air in the first cooling unit can be about −20° C. to −45° C., cold air in the second cooling unit can be about −60° C., and cold air in the third cooling unit can be about −80° C. In this regard, the time for passing the entire cooling system can be about 5 to 6 minutes even after adding a third cooling unit.

When processing a large quantity of food to be frozen, the distance from the feeding entrance to the exit may be about 9 m (each freezing unit is about 4.5 m), about 12 m (each freezing unit is about 6 m), or the like. Even in such a case, the time for passing each freezing unit is about 2.5 to 3 minutes, and processing as a whole is completed in about 5 to 6 minutes.

(Precooling Unit)

In a preferred embodiment, the food freezing system of the invention can comprise a freezing unit for precooling (e.g., freezing unit 100A of FIG. 1; also referred to as a "precooling unit" herein) closer to the feeding section side than to a freezing unit for the main freezing (e.g., freezing unit 100B of FIG. 1). In a preferred embodiment, the precooling unit of the invention can further comprise a first precooling unit and a second precooling unit with different cooling temperatures, in order from the feeding section side. The first precooling unit may have a higher cooling temperature, or the second precooling unit may have a higher cooling temperature between the first precooling unit and the second precooling unit, but preferably the first precooling unit has a higher cooling temperature. Adhesion of food to a transport belt can be prevented by setting a first precooling unit to have a higher cooling temperature in this manner. If food is cooled rapidly, the food is damaged after adhering to a transport belt. In a preferred embodiment, the cooling temperature in a first precooling unit can be about −20° C. to −45° C., and preferably about −35° C. to about −45° C. A cooling temperature in a first precooling unit of about −35° C. to about −45° C. is preferable, as a cooling temperature of the first precooling unit, since food is not cooled rapidly so that food would not adhere to a transport belt.

The cooling temperature in the second precooling unit of the invention can be about −55 to about −60° C., about −60° C. to about −90° C., about −60° C. to about −80° C., about −60° C. to about −70° C., −60° C. to −89° C., −60° C. to −70° C., about −60° C., −60° C., or the like. The cooling temperature in a second precooling unit is preferably about −60° C. to about −90° C. or −60° C. to −89° C., and more preferably −60° C.

Figure 6:
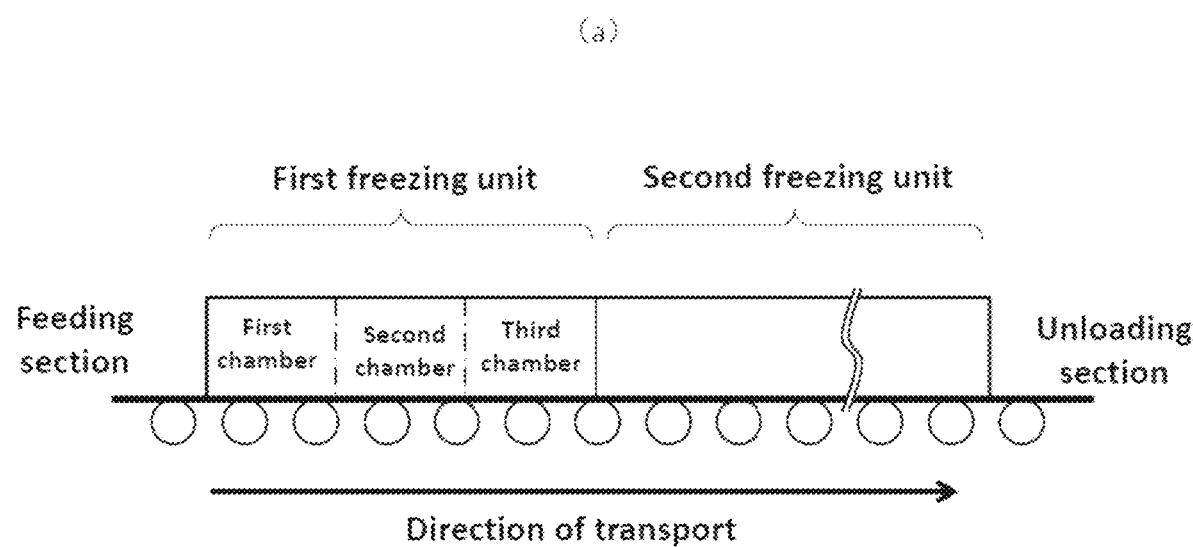
FIG. 6 shows a configuration of a first freezing unit comprising a first precooling unit (first chamber), a second precooling unit (second chamber), and a third precooling unit (third chamber).
Figure 6:
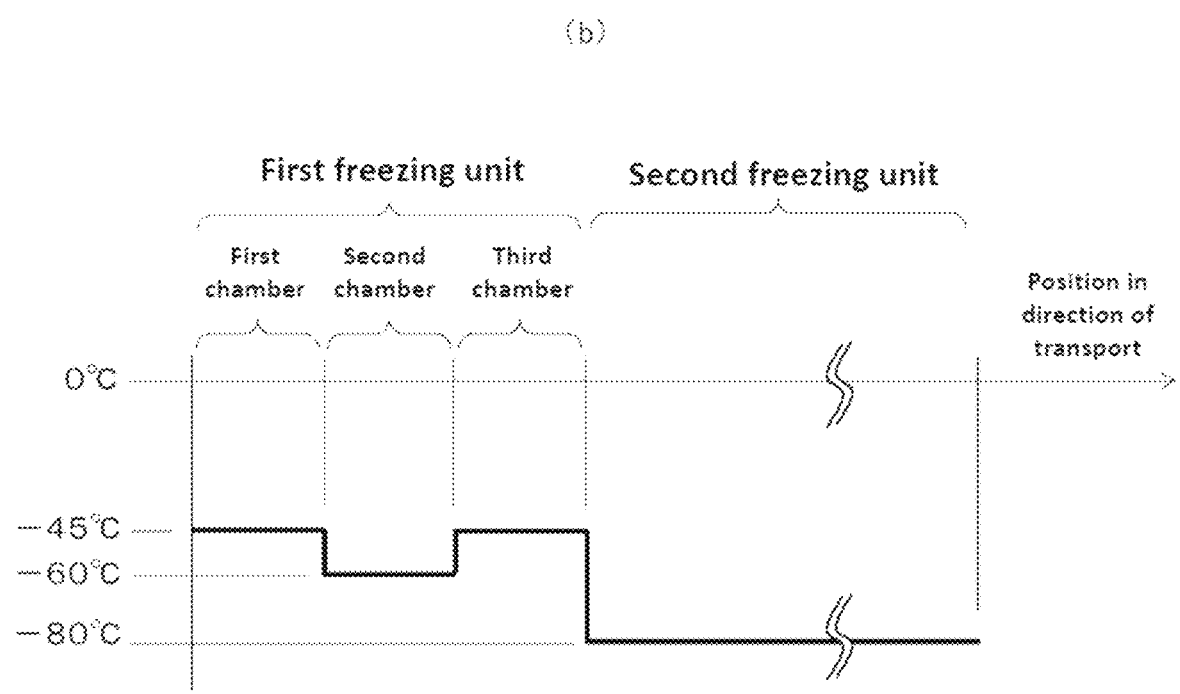

In a preferred embodiment, the precooling unit of the invention can comprise a first precooling unit (first chamber), a second precooling unit (second chamber), and a third precooling unit (third chamber) in this order from the feeding entrance side (FIG. 6(a)). The first precooling unit and the second precooling unit are each cooled at different temperatures. The specific temperature, etc. is described above. The cooling temperature in the third precooling unit is a temperature that is different from that of the adjacent second precooling unit, which may be higher or lower than that of the second precooling unit. The cooling temperature in the third precooling unit is preferably higher than the cooling temperature of the second precooling unit. Such a temperature can be about −20° C. to −45° C., and preferably about −35° C. to about −45° C. (FIG. 6(b)). The cooling temperatures of the first precooling unit and the third precooling unit may be the same or different. Although not intending to be bound by any theory, food can be efficiently cooled by varying the cooling temperature of the third precooling temperature from that of the second precooling temperature in this manner.

In a particularly preferred embodiment, the precooling unit of the invention comprises at least a first precooling unit, a second precooling unit, and a third precooling unit, and the cooling temperatures in the first precooling unit and the third precooling unit are higher than the cooling temperature of the second precooling unit. By first lowering and then raising the cooling temperature in the precooling stage in this manner, the efficiency of freezing food can be increased, and the effect of freezing can be made uniform on food. In a preferred embodiment, the precooling unit of the invention comprises a first precooling unit for cooling food at about −35° C. to about −45° C., a second precooling unit for cooling food at about −60° C., and a third precooling unit for cooling food at about −35° C. to about −45° C.

(Partition Wall or Air Curtain)

Figure 2:
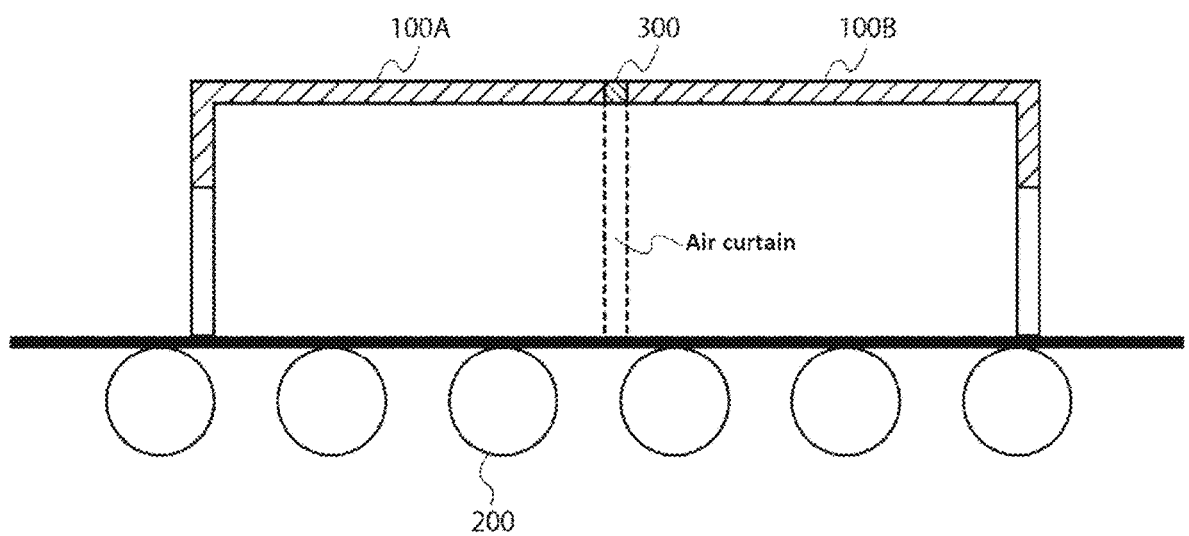
FIG. 2 shows another example of a configuration of the food freezing system of the invention.

A freezing unit and a freezing unit (e.g., the first freezing unit 100A and the second freezing unit 100B), or a first precooling unit, a second precooling unit, and a third precooling unit in a precooling unit (100A), may be partitioned with a partition wall or an air curtain. In a preferred embodiment, freezing units in the freezing system of the invention can be partitioned with an air curtain (FIG. 2). In the example shown in FIG. 2, the food freezing system 1 further comprises an air curtain generating mechanism 300 for generating an air curtain. An air curtain can insulate two adjacent freezing units (e.g., the first freezing unit 100A and the second freezing unit 100B) from each other to prevent each of the refrigerants in the two adjacent freezing unit from mixing.

The air curtain generating mechanism 300 of the invention can be a mechanism for blowing air in an approximately vertical direction from an air blowing vent provided at an upper portion and/or a lower portion of a freezing unit. A virtual insulation wall can be formed with such a mechanism by separating air in the left and right directions by convection of blown air.

The air curtain generating mechanism 300 of the invention can preferably adjust the angle of blowing out air from an air blowing vent provided at an upper portion and/or a lower portion of a freezing unit, so that the air blowing orientation is in the opposite direction of the direction of travel of food. Such a configuration can suppress disturbance in convection of air generated by air blown out colliding with food passing through a frozen unit via a transporting unit or the like. As a result, a thermal condition in the first freezing step can be inhibited from intervening the second freezing step. Furthermore, the mechanism can be configured so that the angle at which air is blown out from the air blowing vent at a lower portion is more angled, with respect to the direction of travel of food, relative to the angle at which air is blown out from the air blowing vent at an upper portion, and air is blown out simultaneously from the air blowing vents at an upper portion and a lower portion. By blowing air from an air blowing vent in the opposite direction from the direction of travel of food in this manner, air in the first freezing unit, which has a higher temperature than air in the second freezing unit, is prevented from flowing into the second freezing unit by blowing air in the opposite direction. This as a result can inhibit changes in retained heat in each of the first freezing unit and the second freezing unit.

When cooling units are partitioned with an air curtain, the temperature in the first cooling unit around the air curtain decreases more compared to the vicinity of the feeding entrance, and the temperature in the second cooling unit around the air curtain increase more compared to the vicinity of the exit to form a temperature gradient in the first cooling unit and the second cooling unit around the air curtain. This allows the cooling temperature to transition smoothly as the food moves from the first cooling unit to the second cooling unit to further alleviate damage to cells of the food. Furthermore, heat can be shielded by convection because heat does not have mass. Thus, an existing freezing apparatus can be modified, and the position of an air curtain generating mechanism can be adjusted readily at a low cost.

Figure 7:
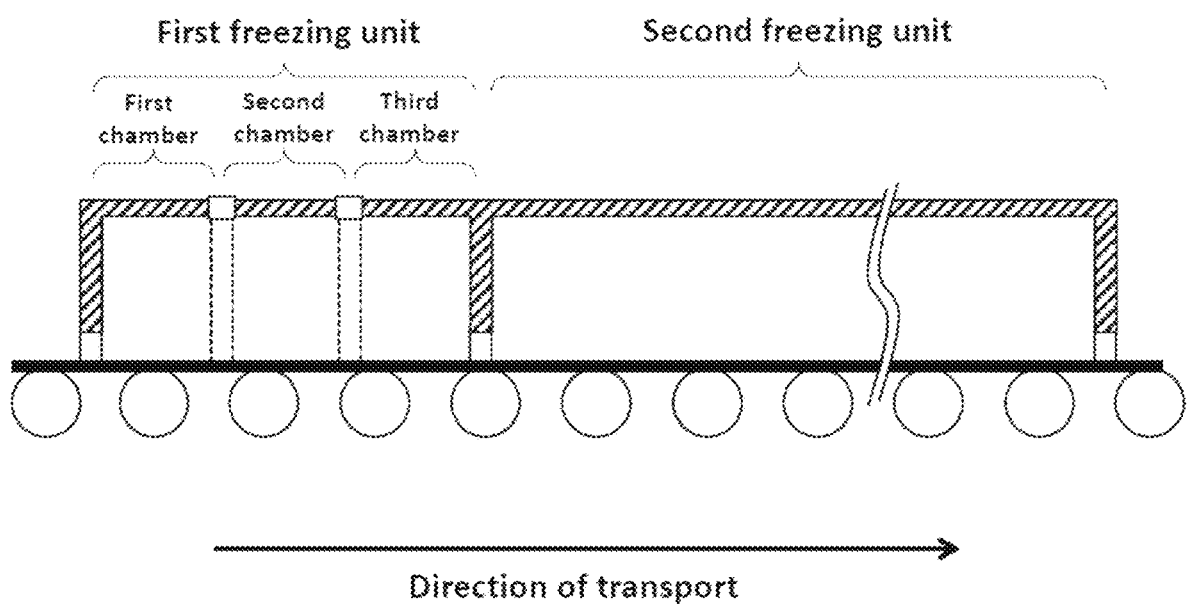
FIG. 7 shows a configuration of a first freezing unit comprising a first precooling unit (first chamber), a second precooling unit (second chamber), and a third precooling unit (third chamber), wherein the first precooling unit (first chamber) and the second precooling unit (second chamber), and the second precooling unit (second chamber) and the third precooling unit (third chamber) are partitioned with an air curtain, and the first freezing unit and the second freezing unit are partitioned with a partition wall.

If there are three of more freezing units, the food freezing system 1 may comprise an air curtain generating mechanism 300 in at least one of the plurality of regions between freezing units, and a partition wall in other regions. In a preferred embodiment, the precooling unit (first freezing unit) 100A and the second freezing unit may be partitioned with a partition wall, and the first precooling unit (first chamber) and the second precooling unit (second chamber) and/or the second precooling unit (second chamber) and the third precooling unit (third chamber) in the precooling unit may be partitioned with an air curtain (FIG. 7).

(Air Blowing Mechanism)

The freezing units 100A and 100B may each comprise an air blowing mechanism. Any air blowing mechanism can be used, as long as it is used in an air blower or air conditioner such as a sirocco fan, turbo fan, airfoil fan, or cross flow fan. The air blowing mechanism comprises an air blowing vent for blowing air sent from an air blower or air conditioner to within a freezing unit. The configuration of the air blowing mechanism is not particularly limited in terms of the number, position, or direction thereof, or the like. The air blowing mechanism may be at the upper portion, lower portion, or side of the freezing unit. Air blowing mechanisms may be at multiple locations at the upper portion, lower portion, or side of the freezing unit, or at another location. An air blowing vent of an air blowing mechanism in a freezing unit is not particularly limited in terms of the number, position, or direction thereof, or the like. The air blowing vent may be at the upper portion, lower portion, or side of the transporting unit. Air blowing vents may be at multiple locations at the upper portion, lower portion, or side of the transporting unit, or at another location. The direction towards which an air blowing vent of an air blowing mechanism blows air in a freezing unit may be in a direction toward food or a direction that is not toward food. The strength of air blown by an air blowing mechanism is not limited, as long as food can be sufficiently cooled. The strength may be constant or variable. For example, in a certain embodiment, a freezing unit has a freezing mechanism on the side, and an air blowing mechanism (fan) on the upper portion.

Preferably, food is cooled in a freezing unit by directing cold air directly onto food. Specifically, an air blowing vent of an air blowing mechanism (e.g., fan) equipped in a freezing unit blows air toward food. This enables food to be quickly frozen.

Figure 8:
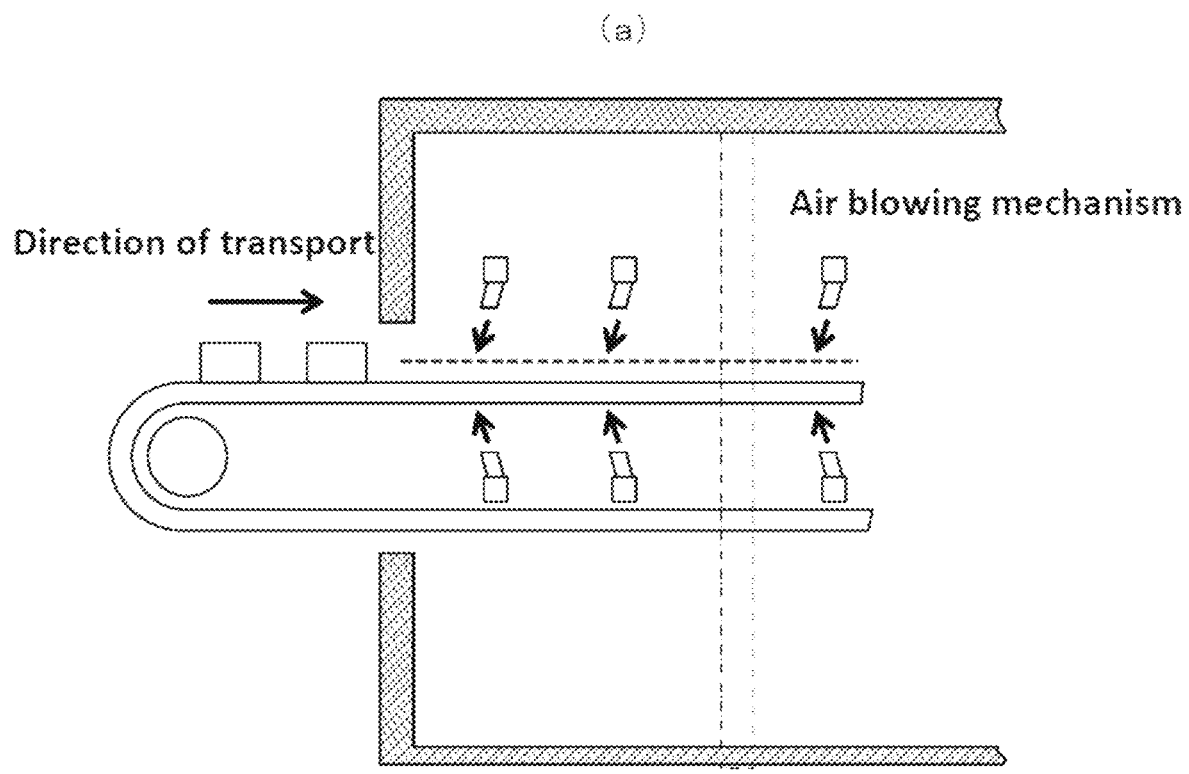
FIG. 8 is a diagram showing an example of a configuration where air blowing vents of an air blowing mechanism are provided at both above and below the food that passes through the transporting unit.
Figure 8:
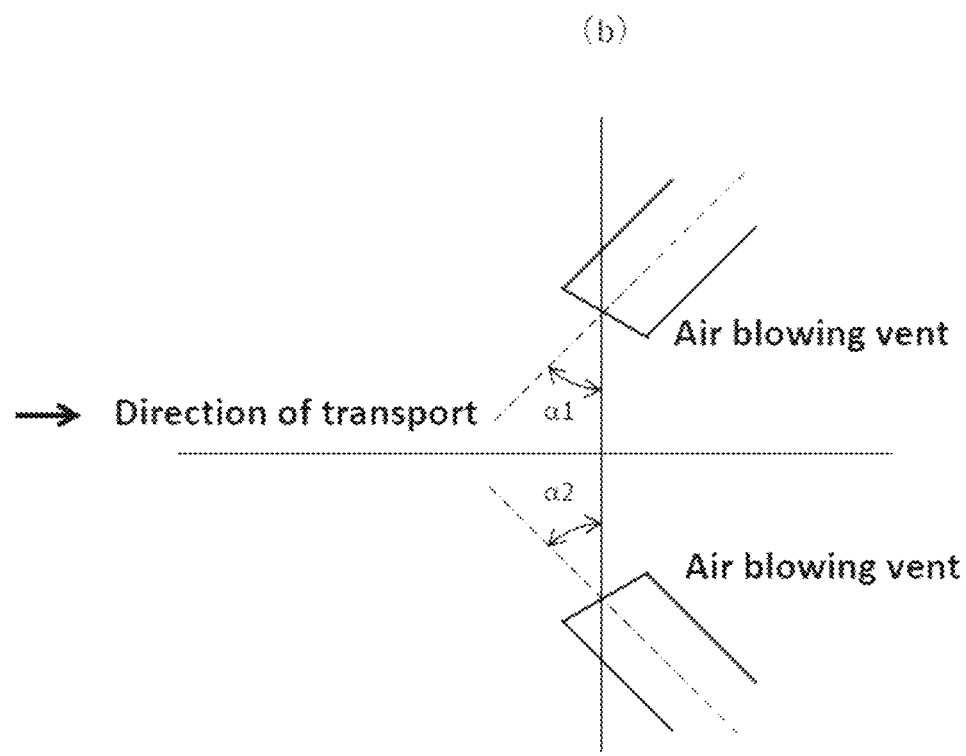

In one embodiment, air blowing vents of an air blowing mechanism are provided at both above and below the food transported by a transporting unit as shown in FIG. 8. Such a configuration enables efficient cooling of food. Preferably, the orientation of an air blowing vent is an orientation against the direction of transport of a transporting unit. Such a configuration can efficiently cool food because air blown out from an air blowing vent would hit the food transported by the transporting unit with great force. Still more preferably, the orientation of an air blowing vent is tilted at an angle in the range of greater than about 0° and less than about 90° with respect to the orientation against the direction of transport of the transporting unit when the orientation in the vertical direction is 0°. The tilt angle can be any angle that would not obstruct the food transported on a transporting unit from traveling. Still more preferably, the orientation is tilted at an angle of about 3° to about 30°, and particularly preferably 3° to about 18° (angles α1 and α2 shown in FIG. 8). A tilt angle in this range enables efficient cooling of food while maintaining smooth transport of the food. While the tilt angle of the upper air blowing vent and the tilt angle of the lower air blowing vent are the same in the embodiment shown in FIG. 8, the present invention is not limited thereto. The tilt angle of the upper air blowing vent and the tilt angle of the lower air blowing vent may be different from each other.

Figure 9:
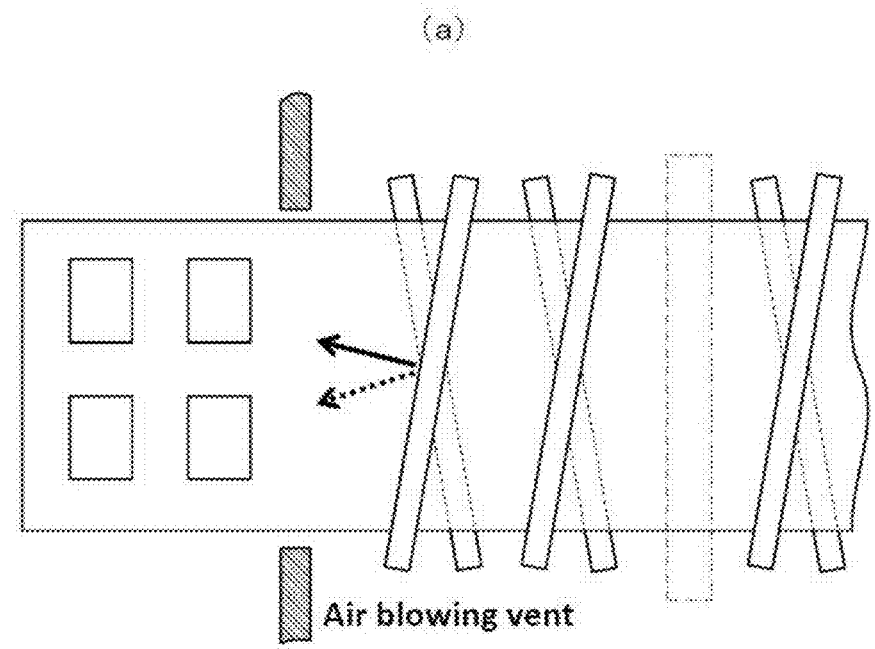
FIG. 9 is a top view showing an example of a configuration where air blowing vents of an air blowing mechanism are provided at both above and below the food that passes through the transporting unit.
Figure 9:
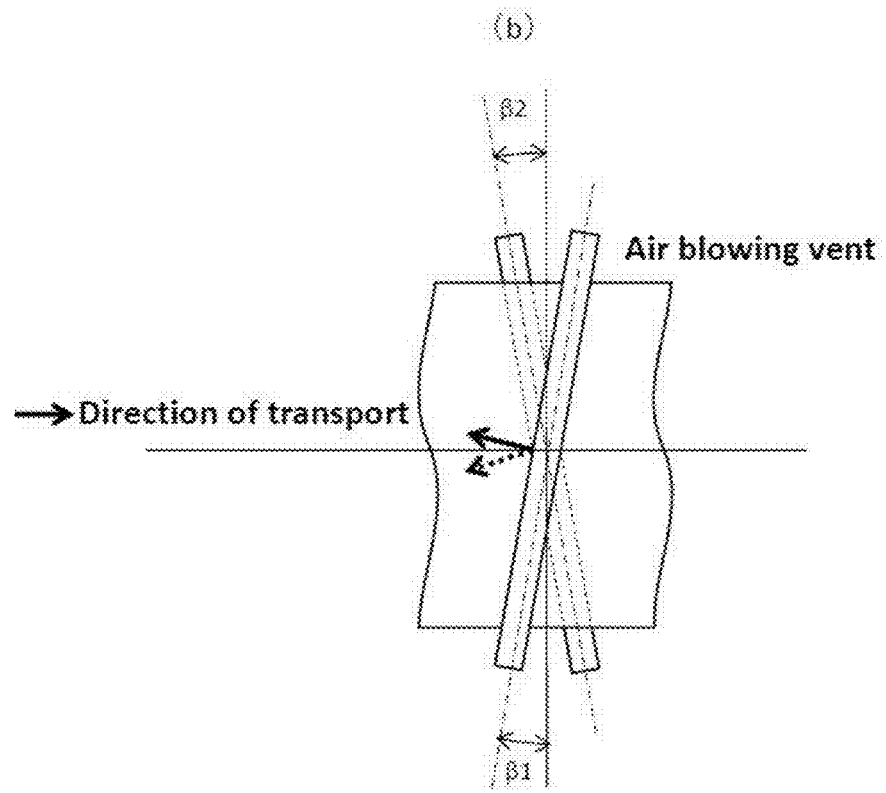

As shown in FIG. 9, an air blowing vent of an air blowing mechanism can be provided so as to be tilted with respect to the direction that is orthogonal to the direction of transport of a transporting unit, and the orientation of the air blowing vent provided at the upper portion can be provided so as to intersect with the orientation of the air blowing vent provided at the lower portion. More preferably, the orientation of an air blowing vent is tilted at an angle of about 3° to about 300 and particularly preferably about 3° to about 24° (angles β1 and β2 shown in FIG. 9(b)) when the orientation that is orthogonal to the direction of transport is 0°.

Figure 10:
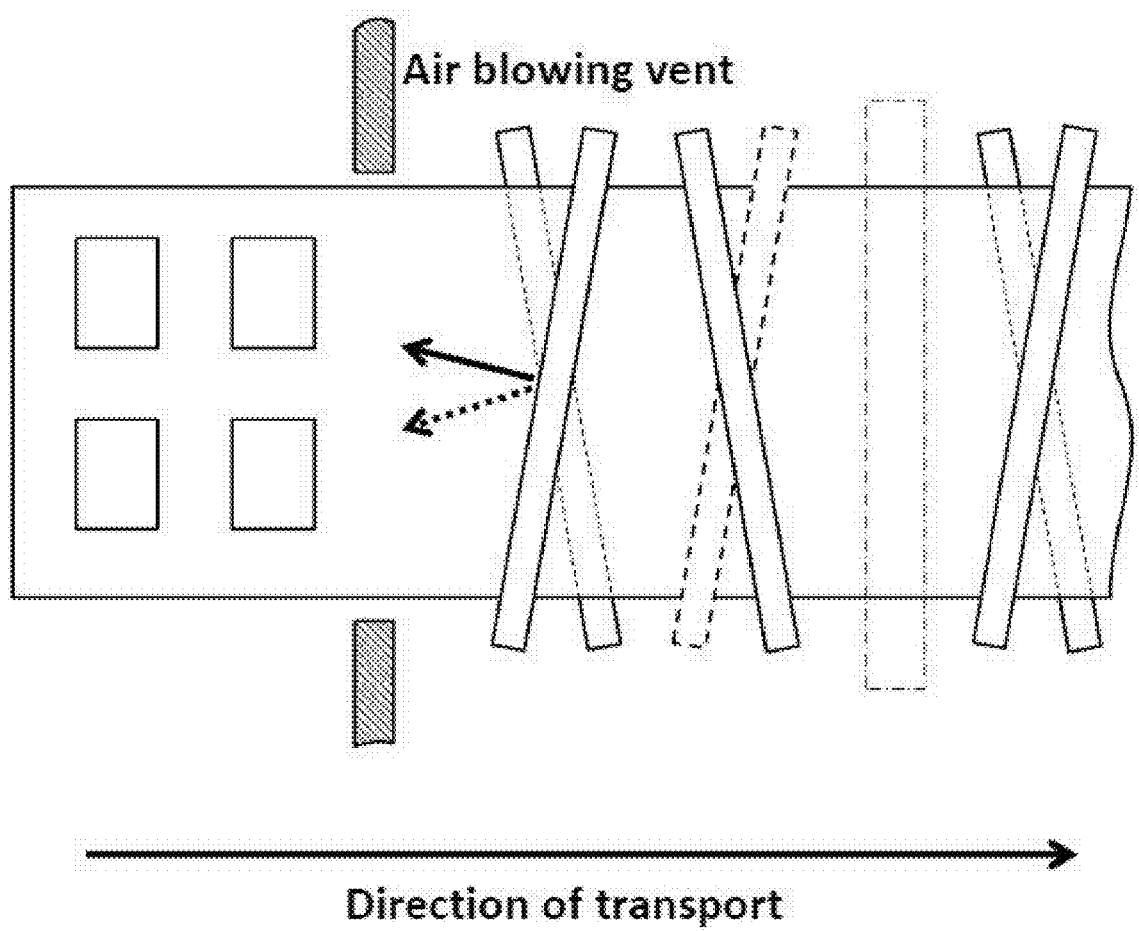
FIG. 10 is a top view showing another example of a configuration where air blowing vents of an air blowing mechanism are provided at both above and below the food that passes through the transporting unit.

The orientation of air supplied to food can generate a small random air flow near the surface of the food by providing air blowing vents so that the orientation of the upper air blowing vent intersects with the orientation of the lower air blowing vent at a predetermined tilt angle. As a result, the effect of stirring air within a freezing unit is improved to enable more efficient and uniform cooling of food. In the embodiment shown in FIG. 9, the tilt angle of the upper air blowing vent and the tilt angle of the lower air blowing vent are the same, but the present invention is not limited thereto. For example, the tilt angle of the upper air blowing vent and the tilt angle of the lower air blowing vent may be different from each other. Further, the orientation of tilt of multiple air blowing vents provided at the upper portion and the lower portion along the direction of transport with respect to the direction that is orthogonal to the direction of transport of a transporting unit may all be the same orientation as shown in FIG. 9(a), or the orientation of tilt may be alternated as shown in FIG. 10. By alternating the orientation of tilt in this manner, the effect of stirring air within a freezing unit improves more effectively to enable more efficient and uniform cooling of food.

The embodiments shown in FIGS. 8 and 9 are suitable for cooling large food, especially food in a block form or the like, but the present invention is not limited thereto. For example, the embodiments may be applied to small food such as food in a particulate form.

Figure 11:
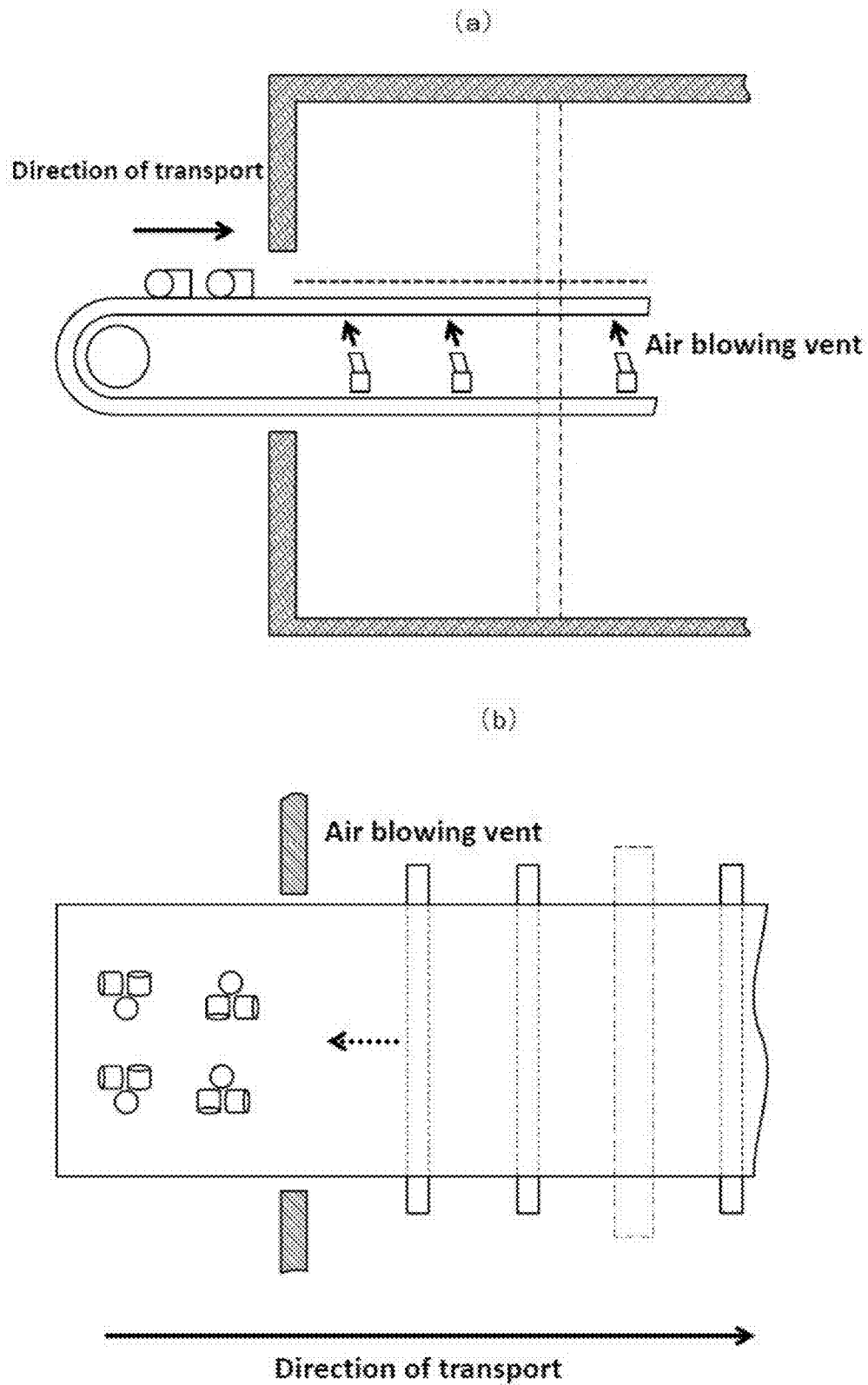
FIG. 11 is a diagram showing an example of a configuration where air blowing vents of an air blowing mechanism are provided below the food that passes through the transporting unit.

In another embodiment, an air blowing vent of an air blowing mechanism is provided below the food transported by a transporting unit as shown in FIG. 11. The embodiment shown in FIG. 11 is suitable especially for cooling small food in a particulate form or the like. By blowing air toward food only from an air blowing vent provided at a lower portion of a transporting unit in this manner, food can soar up by the air. As a result, adhesion of food to be cooled with a transport belt can be further reduced. The orientation of an air blowing vent is preferably an orientation against the direction of transport of a transporting unit in the same manner as FIG. 8. Such a configuration can efficiently cool food because air blown out from an air blowing vent would hit the food transported by the transporting unit with great force. In this embodiment, the orientation of the air blowing vent is provided to be parallel to the direction that is orthogonal to the direction of transport of the transporting unit as shown in FIG. 11(*b*), but the present invention is not limited thereto. For example, the orientation of the air blowing vent can be tilted with respect to the direction that is orthogonal to the direction of transport of the transporting unit as shown in FIG. 9.

(Others)

In a certain embodiment, the freezing unit 100A and/or 100B comprises a sensor. A sensor quantifies and transmits information related to the condition inside the freezing unit. Information related to the condition inside the freezing unit may be transmitted to an administrative unit or another part of a system (e.g., transporting unit 200). Examples of the sensor include temperature sensors and humidity sensors. The position of the sensor is not limited, but it can be advantageous for controlling the system to dispose the sensor preferably in the vicinity of the transporting unit 200 that penetrates the freezing unit so that the temperature of food to be cooled can be measured accurately.

Each of the freezing units 100A and 100B may be, for example, an air quick-freezer or a liquid quick-freezer, but can be preferably an air quick-freezer. A representative example of a liquid quick-freezer uses cooling by liquid nitrogen. However, the temperature thereof is constant, so that it is difficult to set the initial temperature. The processing capacity can be restricted in a multi-stage configuration for cooling with liquid nitrogen, but an air quick-freezer can be preferable in view of the cost.

Figure 3:
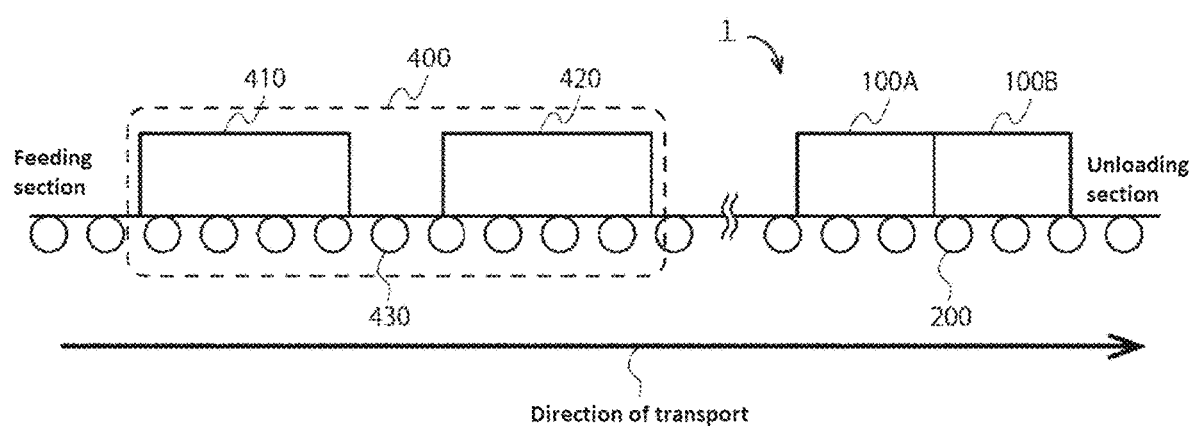
FIG. 3 shows an example of a food processing system combining a food preprocessing (sterilization) unit and a food freezing system.

Food can be subjected to preprocessing such as washing or sterilization prior to being placed in a food freezing system. Preprocessing such as sterilization can be a preprocessing method that is commonly used such as blanching. FIG. 3 dhows an example of a food processing system combining a food preprocessing (sterilization) unit for preprocessing food and a food freezing system of the invention. As shown in FIG. 3, a food processing (sterilization) unit 400 comprises a heating unit 410 comprising a heating mechanism for heating food, a cooling unit 420 comprising a cooling mechanism for cooling the food heated by the heating unit 410, and a transporting unit 430 for transporting the heated food through the heating unit 410 and the cooling unit 420 to the food freezing system 1. While the food preprocessing (sterilization) unit 400 and the food freezing system 1 are shown together in FIG. 3 for convenience, the food preprocessing (sterilization) unit 400 and the food freezing system 1 may be physically separated independent systems, or a continuous system sharing a transporting unit.

(Heating Unit)

Figure 4:
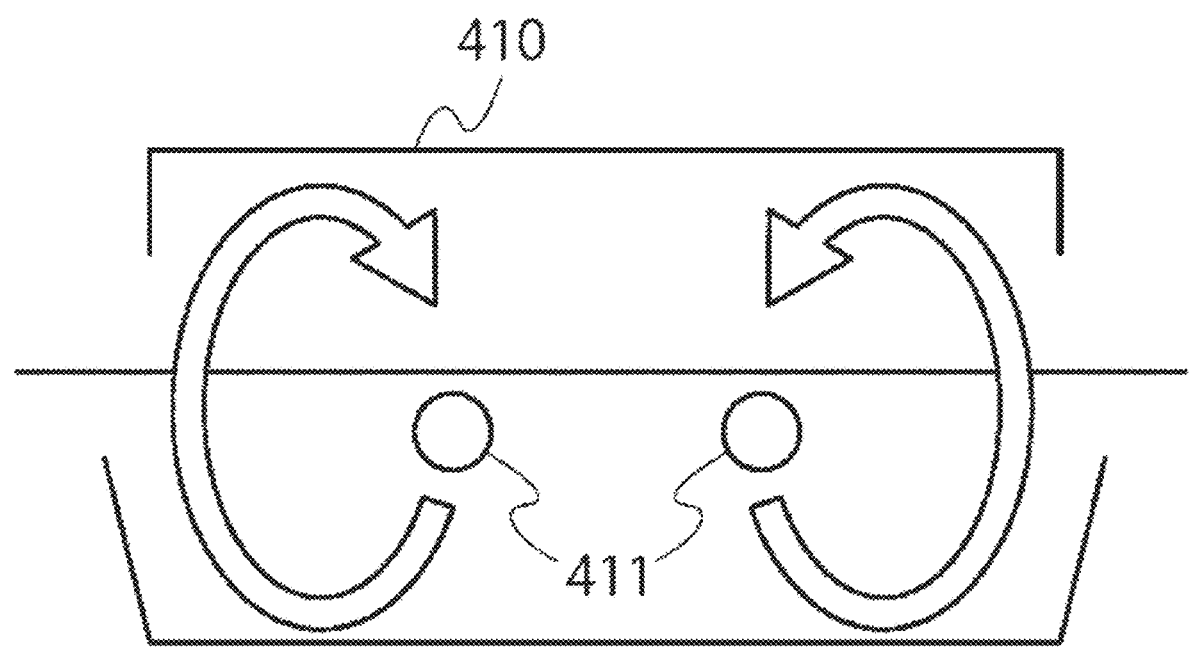
FIG. 4 shows an example of a configuration of a heating unit in a food preprocessing (sterilization) unit.

As shown in FIG. 4, the preprocessing (sterilization) unit 400 comprises the heating unit 410 comprising a heating mechanism 411 for heating food. The configuration of the heating unit 410 and the heating mechanism 411 is not limited, as long as food can be heated to a desired temperature. The transporting unit 430 penetrates through the heating unit 410. Food is heated while the food is transported by the transporting unit 430 within the heating unit 410. It is desirable that food is quickly heated to a desired temperature and stably maintained thereafter at the desired temperature. Any heating unit can be used as the heating unit 410, as long as the temperature can be adjusted, such as a heating unit that is commonly used in cooking food items or a thermostatic tank with a humidifying function. To be compatible with various types of food, the shape of the heating unit 410 is preferably, but is not limited to, a tunnel shape or a box shape that extends along the direction of transport of food.

Preferably, the preprocessing (sterilization) unit 400 can quickly heat and stably maintain food at the intermediate temperature zone. Heating at the intermediate temperature zone can remove harshness in taste and/or inactivate enzymes (examples thereof include, but are not limited to, glycolytic enzymes such as pectinase and cellulase, oxidases such as glucose oxidase, and the like), and/or sterilize food without destroying cells or tissue of the food. On the other hand, heating at a temperature above 100° C. (heating using boiling water or flame) is not preferred in the present invention because cells of food are destroyed, resulting in an outflow of umami components from the cells.

The heating mechanism 411 heats food, preferably by releasing heat inside the heating unit 410. In one embodiment, heat can be mediated by a high temperature substance that can heat food by contacting the food. Heat released inside a heating unit 410 can raise the temperature inside the heating unit 410 to heat food.

In a representative embodiment, the heating unit 410 indirectly heats food. With direct heating, heat mediating substances in contact with food are separated into a heat mediating substance from a supplying unit with a relatively high temperature that directly contacts the food and a heat mediating substance with a relative low temperature that is circulated in convection in the heating unit. The temperature difference thereof is significant such that it is difficult to stably maintain a temperature for heating food. In comparison, "indirect" heating can stably maintain the temperature for heating food because the temperature difference in heat mediating substances in contact with food is small. Further, indirect heating can readily heat food at a constant temperature, for example, by intermittently supplying heat with a constant temperature (e.g., 98° C. steam). Thus, a complex mechanism for finely controlling the temperature of a heat mediating substance would not be required. As a result, cost reduction can also be achieved. On the other hand, an intermittently supplied heat mediating substance in direct heating cannot achieve consistent heating of food in some cases as a result of a significant difference in the temperature for heating food in the presence and absence of a heat mediating substance with a relatively high temperature that directly contacts the food, i.e., while a heat mediating substance is supplied and while supply thereof is stopped.

In a preferred embodiment, the heating unit 410 indirectly heats food. Controlling the heating at the intermediate temperature zone is challenging. Specifically, excessive heating would destroy cells of food to impair the taste and mouthfeel of the food, while insufficient heating would result in insufficient sterilization or removal of harshness in taste. For this reason, the inventors controlled the temperature to be consistent in a region where food passes through in the heating unit instead of directly heating the food, resulting in the achievement of a consistent heating temperature control for food.

For example, a substance with a high temperature, in principle, would have a low density and relatively moves up. Meanwhile, releasing a heat mediating substance downward can induce convection of the heat mediating substance, so that the temperature within the heating unit can be stably maintained within a constant range.

In a preferred embodiment, the heating unit 410 further comprises an air blowing mechanism (e.g., fan). Such a fan can constantly generate convection near the food to maintain the temperature contacting the food to be constant. The air blowing mechanism in the heating unit 410 preferably does not blow air toward the transporting unit 430, but does so in a direction that is not toward the transporting unit 430. This is for facilitating control in the intermediate temperature zone in the vicinity of the transporting unit 430 by not directly blowing air onto food in the same manner as indirect heating.

Furthermore, it may be difficult to stabilize the temperature near the top or bottom surface in the heating unit 410. Thus, the transporting unit 430 penetrating the heating unit 410, which is configured to pass through the middle portion between the top and bottom surfaces of the heating unit 410, can avoid having a region that tends to have an unstable temperature to allow food to be heated uniformly in a stable temperature region.

The heating mechanism 411 can heat food to about 45 to about 90° C., preferably about 50° C. to about 85° C., and more preferably about 60° C. to about 75° C. However, the temperature at which food is heated with the heating mechanism 411 in the preprocessing (sterilization) unit 400 varies depending on the food or application. Such a temperature can be appropriately determined by those skilled in the art. It should be noted that heating of food can be confirmed by measuring the core temperature.

The temperature of heat released by the heating mechanism 411 may be any temperature that can achieve intended heating of food. Typically, the temperature of released heat can be 98° C.

The heating mechanism 411 may be any mechanism that can achieve heating of food at the intermediate temperature zone. Examples thereof include, but are not limited to, steam supplying units, micro-mist supplying units, clustered air supplying units, and the like.

In one embodiment, a heat mediating substance is steam, and the heating mechanism 411 can be a steam supplying unit. However, water droplets may adhere to the surface of food when heated using steam. If it is preferable to avoid such adherence of water droplets, the heating mechanism 411 may heat food using a heat mediating substance comprising water droplets with a smaller particle size, such as micro-mist or clustered air.

In a certain embodiment, the heating mechanism 411 can heat food by ejecting a heat mediating substance such as steam as shown in FIG. 4. In a certain embodiment, the heating mechanism 411 heats food by ejecting a heat mediating substance of 98° C. As disclosed above, the heating mechanism 411 is configured so that an ejected heat mediating substance indirectly heats food. Examples of such a configuration include, but are not limited to, a configuration comprising the heating mechanism 411 at a lower portion of the transporting unit 430 and a heat mediating substance ejection hole directed downward, as shown in FIG. 4. Preferably, the heating mechanism 411 does not continuously eject a heat mediating substance, but intermittently ejects a heat mediating substance with an interval between ejections. In a certain embodiment, an ejection hole can be opened and closed. In another embodiment, opening and closing of an ejection hole is controlled automatically, or by an external input.

In a certain embodiment, the heating unit 410 comprises a sensor. Examples of sensors include temperature sensors and humidity sensors. A sensor quantifies and transmits information related to the condition inside the heating unit 410. Information related to the condition inside the heating unit 410 may be transmitted to an administrative unit or another part of a system (e.g., transporting unit 430, heating unit 410, cooling unit 420, first freezing unit 100A, second freezing unit 100B, or transporting unit 200). The position of the sensor is not limited, but the sensor can be preferably disposed in the vicinity of the transporting unit 430 that penetrates the heating unit 410. In the food preprocessing (sterilization) unit 400, it is important to maintain a uniform temperature in a region where food passes through. Thus, it can be advantageous to control the heating mechanism 411 in accordance with a measurement value of the temperature in the vicinity of the transporting unit 430. In a certain embodiment, a sensor is at a distance of about 30 cm or less, preferably about 15 cm from the transporting unit 430 in the heating unit 410.

In a certain embodiment, the heating mechanism 411 is intermittently driven by a temperature sensor. For example, when a measurement value of the temperature sensor provided in the vicinity of the transporting unit 430 reaches a defined temperature, the lid of an ejection hole for a heat mediating substance such as steam is closed to stop discharge of the heat mediating substance, and when the temperature decreases, the heat mediating substance is ejected again to mix air in a heating unit with the heat mediating substance at a suitable ratio, so that the temperature in the heating unit 410 can be maintained at a constant temperature.

If the heating mechanism 411 is a steam supplying unit, a boiler or a water pipe, a power source, or the like on the outside of the heating mechanism 411 can be automatically controlled based on the value of the internal temperature and/or humidity detected by the aforementioned sensor to automatically control the temperature of steam and the amount of steam released in order to maintain the internal temperature in a predetermined temperature region during operation of the steam supplying unit. The time period during which the food is in the heating unit is 1 to 8 minutes, and preferably 1 to 3 minutes. The time period is suitably adjusted depending on the thermal conductivity of food and the size of cut food. The surface of food can be sterilized as a result of exposure to the internal temperature described above for such a time period.

Preferably, the heating unit 410 is configured so that a heat mediating substance such as steam can circulate in convection. Even if there is variability in the temperature throughout the entire heating unit 410, the extent of heating of food during a heating step can be consistent with convection of the heat mediating substance. Further, the amount of heat mediating substance in contact with food per unit time can be increased, so that the food can quickly reach a desired temperature without using a high temperature.

In a certain embodiment, the bottom portion of the heating unit 410 can have a shape that induces convection of a heat mediating substance such as steam. Examples of such a shape include, but are not limited to, a boat shape with edges of the bottom portion that are processed to have a slope as shown in FIG. 4. Convection of a heat mediating substance can function as a so-called air curtain for blocking the entry of cold outside air into the heating unit 410 and/or leakage of warm heat mediating substance from inside the heating unit 410 by convection in the top and bottom directions at a loading entrance of the heating unit 410 or the unloading exit.

A heat mediating substance (e.g., steam) generates convection on its own at a high temperature exceeding 90° C. Meanwhile, generated convection is moderate at, for example, a temperature zone around 70° C. Thus, it may be desirable to use a mechanism that proactively generates convection of a heat mediating substance.

The heating unit 410 preferably has an air blowing mechanism as the mechanism for proactively generating convection of a heat mediating substance. The air blowing mechanism can promote convection of a heat mediating substance within the heating unit 410. Any air blowing mechanism can be used, as long as it is used in an air blower or air conditioner such as a sirocco fan, turbo fan, airfoil fan, or cross flow fan. The configuration of the air blowing mechanism is not particularly limited in terms of the number, position, or direction thereof, or the like. The air blowing mechanism may be at the upper portion or side of the heating unit 410 or both, or at another location. In a certain embodiment, the direction toward which an air blowing mechanism blows air may be in a direction toward food or a direction that is not toward food. In a preferred embodiment, the direction toward which an air blowing mechanism in the heating unit 410 blows air is not in the direction toward food. The strength of air blown by an air blowing mechanism is not limited, as long as sufficient convection of a heat mediating substance can be generated. The strength may be constant or variable. The number of air blowing mechanisms (preferably fans) installed and the air blowing capacity can be suitably adjusted while taking into consideration the volume of the heating unit 410, type and amount of food to be processed, transport speed of food, or the like. Upon operation of the heating mechanism 411, the temperature and humidity inside the heating unit 410 may be continuously detected with a sensor installed in each inside portion to adjust the number of rotations of a fan and the amount of air blown by the fan so that the temperature and humidity inside the heating unit 410 would be consistent.

In a certain embodiment, the heating unit 410 is not sealed. This is because cells of food could be destroyed by the pressure of air expanded by heat if the heating unit 410 is sealed. In such a case, opened sections provided at a feeding entrance and a discharge exit can serve the role of a pressure valve, and convection of a heat mediating substance can serve the role of an air curtain.

The heating unit 410 may have a single or multiple heating mechanisms 411. In a certain embodiment, the heating mechanism 411 comprises at least two heating mechanisms along the direction of transport of a transporting unit. In a certain embodiment, the heating mechanism 411 is a pipe comprising an ejection hole for a heat mediating substance such as steam. There may be multiple pipes. The amount of heat released by multiple heating mechanisms may be different. In a certain embodiment, a heating mechanism close to the entrance of the heating unit 410 releases a greater amount of heat than the heating mechanism 411 close to the exit of the heating unit 410. In a certain embodiment, the heating unit 410 comprises at least two heating mechanisms along the direction of transport of a transporting unit, and a heating mechanism close to the entrance of the heating unit 410 can release a greater amount of heat mediating substance than a heating mechanism close to the exit of the heating unit 410. In a certain embodiment, pipes of the heating mechanism 411 are multiple pipes with different diameters. Preferably, the diameter of a pipe close to the feeding entrance is greater than the diameter of a pipe close to the discharge exit. Such a configuration with the heating mechanism close to the entrance of heating unit 410 releasing a greater amount of heat than the heating mechanism close to the exit of the heating unit 410 can further promote heating of low temperature food fed into the heating unit 410 to a predetermined temperature, and maintain the temperature at the predetermined temperature after reaching the predetermined temperature, whereby the processing time of food at the intended predetermined temperature can be ensured longer. In a certain embodiment, ejection holes of multiple pipes each comprise an opening and closing valve that can be independently controlled.

In some embodiment, the heating unit 410 is a steam heater. In some embodiments, the heating unit 410 is a steamer extending along the direction of transport of food, and the heating mechanism 411 releases a heat mediating substance (examples thereof include, but are not limited to, steam, micro-mist, clustered air, and the like) into the steamer from numerous microholes provided on an inner wall of the steamer.

In a certain embodiment of the food preprocessing (sterilization) unit 400, the heating unit 410 is, for example, a site for heating food for 1 to 8 minutes under a humid atmosphere at 45° C. to 90° C., and is preferably a steamer extending along in the direction of transport. The transporting unit 430 penetrates the inside of the heating unit 410. In a certain embodiment, a feeding section and the heating unit 410 are continuous in the food processing system 10. In a certain embodiment, food is continuously loaded into the heating unit 410 that is opened for the transporting unit 430 during operation of the food processing system 10. During the process of the food passing through the inside of the heating unit 410, the temperature of the food rises from the surface, and subsequently the temperature of the center portion also rises to 45° C. to 90° C., and the heated state is sustained, from the surface to the center portion, for 1 to 8 minutes.

In some embodiments, the internal temperature of the heating unit 410 is adjusted in accordance with the type of food. For example, the temperature is adjusted to a comparatively high temperature region when heating a large piece of food with low thermal conduction. For example, the temperature is adjusted to a comparatively low temperature region when heating a small piece of food with excellent thermal conduction. The internal temperature of the heating unit 410 is maintained at 45° C. to 90° C., preferably 50° C. to 85° C., and more preferably 60° C. to 80° C. The time period during which food is in the heating unit 410 is 1 to 8 minutes, and preferably 1 minute to 3 minutes. The time period can be suitably adjusted depending on the thermal conductivity of food and the size of cut food. During the process of the food passing through the inside of the heating unit 410, the temperature of the food rises from the surface, and subsequently the temperature of the center portion also rises to 45° C. to 90° C., and the heated state is sustained, from the surface to the center portion, for 1 to 8 minutes and preferably 1 to 3 minutes. The internal temperature of the heating unit 410 lower than 45° C. is not preferred, because enhancement in taste of food and reduction in the final cooking time cannot be expected. The internal temperature of the heating unit 410 in excess of 95° C. is not preferred because food loses the flavor of fresh food by being subjected to normal heating preparation such as simmering, broiling, frying, or steaming.

In a certain embodiment, the heating unit 410 is preferably a steamer for heating food by generating a mist-like heat mediating substance such as steam inside. The shape of the heating unit is preferably a rectangle extending along the direction of transport. The heat mediating substance is released within the steamer from numerous microholes provided on an internal wall of such a steamer to heat the surface of continuously moving food uniformly. A boiler or water pipe, a power source, a temperature sensor, a humidity sensor, or the like accompanies such a steamer for humidification and heating. The temperature and humidity of the inside of the steamer are set to an optimal value that is dependent on the type and size of food. The humidity of heat mediating substance and the amount of the heat mediating substance released are automatically adjusted based on the settings and automatically measured values of humidity and temperature inside the steamer. An air blowing fan provided at an adjustment section is also used for such automatic adjustment in a short period of time.

The part where food exits the heating unit 410 (exit) is also open during the operation of the food processing system 10 in the same manner as the entrance of the heating unit 410. Food continuously moves within the heating unit 410 without stagnation and is discharged from the heating unit 410 to the cooling unit 420.

(Cooling Unit)

The food processing system 10 comprises the cooling unit 420 comprising a cooling mechanism for cooling food. The configuration of the cooling unit 420 and the cooling mechanism is not limited, as long as the inside of the cooling unit 420 can be maintained at a desired temperature.

The inside of the cooling unit 420 can be maintained at −10° C. to −40° C., −10° C. to −35° C., −10° C. to −30° C., −10° C. to −25° C., −10° C. to −20° C., −10° C. to −15° C., or a high temperature, but the temperature is not limited thereto.

The cooling unit 420 may comprise an air blowing mechanism. Any air blowing mechanism can be used, as long as it is used in an air blower or air conditioner such as a sirocco fan, turbo fan, airfoil fan, or cross flow fan. The configuration of the air blowing mechanism is not particularly limited in terms of the number, position, or direction thereof, or the like. The air blowing mechanism may be at the upper portion or side of the cooling unit 420 or both, or at another location. The direction toward which an air blowing mechanism blows air in the cooling unit 420 may be in a direction toward food or a direction that is not toward food. The strength of air blown by an air blowing mechanism is not limited, as long as food can be sufficiently cooled. The strength may be constant or variable. In a certain embodiment, a cooling mechanism is on the side, and an air blowing mechanism (fan) is at the upper portion of the cooling unit 420.

Preferably, the cooling unit 420 directly cools food. Specifically, the air blowing mechanism (e.g., fan) installed in the cooling unit 420 blows air toward the food. The food can be quickly cooled thereby. This is advantageous in the present invention. This is because food that is sterilized by heating in the heating unit 410 is at risk of having microorganisms adhere again at a temperature near 24° C. to 37° C., but the time period during which food remains in this temperature zone is shortened due to rapid decrease in the temperature by direct cooling.

In a certain embodiment, the cooling unit 420 comprises a sensor. The sensor quantifies and transmits information related to the condition inside the cooling unit 420. Information related to the condition inside the cooling unit 420 may be transmitted to an administrative unit or another part of a system (e.g., transporting unit 430, heating unit 410, first freezing unit 100A, second freezing unit 100B, or transporting unit 200). Examples of sensors include temperature sensors and humidity sensors. The position of the sensor is not limited, but it can be advantageous for controlling the system to dispose the sensor preferably in the vicinity of the transporting unit 430 that penetrates the cooling unit 420 so that the temperature of food to be cooled can be measured accurately.

The cooling unit 420 may be, for example, a commonly used freezer, and may be shaped as a tunnel freezer or the like.

In a certain embodiment, the cooling unit 420 is a site for cooling food, which has been heated in the heating unit 410, for 2 to 8 minutes under the temperature of −10 to −40° C. The food is continuously moved inside the cooling unit 420 and is discharged without stagnation. To rapidly cool food in the cooling unit 420, a structure that covers the entire cooling unit 420 with a cooling apparatus, which can readily adjust the temperature, is preferable. Examples of such a cooling apparatus that is used include a tunnel freezer. The shape of the cooling unit 420 is preferably a rectangle extending along the direction of transport of food. As such a cooling unit 420, the so-called tunnel freezer is preferable. The temperature inside the cooling unit 420 is maintained at −10 to −40° C. and preferably −10 to −20° C. The time period during which food is in the cooling unit 420 is 2 to 8 minutes, preferably 2 to 5 minutes, and more preferably 2 to 4 minutes. The time period can be suitably adjusted depending on the thermal conductivity of food and the size of cut food. When food exits the cooling unit 420, the temperature of food, from the surface to the center portion, is lowered to 5° C. to −40° C. and preferably 2° C. to −20° C.

When processed food items for refrigerated storage (so-called refrigerated food items, including "chilled food items") are produced in the cooling unit 420 in the food preprocessing (sterilization) unit 400 of the food processing system 10, the temperature of the cooling unit 420 is suitably adjusted so that the temperature at the center of food items at the exit of the cooling unit 420 is about 5° C. or lower, preferably about 1° C. to about 4° C., and more preferably about 2° C.

(Transporting Unit)

The food preprocessing (sterilization) unit 400 of the food processing system 10 comprises the transporting unit 430 for transporting food through the heating unit 410 and the cooling unit 420. The configuration of the transporting unit 430 is not particularly limited, as long as it has a function of continuously moving the food.

It can be advantageous to heat and/or cool and/or freeze food while having the food move for uniformly processing a large quantity of food at a consistent temperature. For example, when food is processed at rest, there would be a difference in the processing temperature for each food due to variation in temperatures within the processing space. Meanwhile, processing while moving food along in the direction of transport of the food can eliminate the difference for each food due to variation in the temperature within a space.

The transporting unit 430 preferably transports food through the heating unit 410 and the cooling unit 420 at a constant speed. In a certain embodiment, the transporting unit 430 has an adjusting mechanism for adjusting the constant speed. The adjusting mechanism may be capable of automatically adjusting the constant speed, adjusting the speed to a manually set speed, or both. This allows the transporting unit 430 to be configured to transport food such that the food passes through the inside of the heating unit 410 for a desired period of time and to be configured to transport food such that the food passes through the inside of the cooling unit 420 for a desired period of time. In a certain embodiment, the transporting unit 430 is preferably a conveyor belt. In a certain embodiment, the transporting unit 430 has a through hole. For example, the transporting unit 430 with a through hole may be a meshed conveyer belt. A system may have multiple transporting units 430. Multiple transporting units 430 in parallel can increase the amount of food processed per unit time to enhance the processing capability of the system of the invention. Food may be transported directly on the transporting unit 430 or transported by the transporting unit 430 in a container containing food. In such a case, a ventilated container is preferably used. A ventilated container is, for example, a container with a through hole on the bottom and/or side surface. Such a container can be, for example, a container comprising a ventilated meshed member on the bottom and/or side surface. Inclusion of a through hole and/or meshed member in the transporting unit 430 and/or container can not only enable food to pass through a consistent temperature zone, but also cause heat to equally affect each food.

The food transporting speed can be freely determined in the range of several meters to tens of meters per minute. The optimal transporting speed matching the type or size of food can be determined so that the food reaches the exit of the heating unit 410 when the core temperature of the food rises to a suitable temperature and the temperature is maintained for a suitable time period. Further, the transporting unit 430 may transport food through the cooling unit 420 at such a transporting speed. In such a case, the cooling temperature or an air blowing mechanism of the cooling unit is preferably adjusted in accordance with the time during which food passes through the cooling unit 420 at said transport speed.

In some embodiments, food is continuously moved by the transporting unit 430 to a feeding section, heating unit 410, cooling unit 420, and unloading section in this order. A conveyor belt is preferred as the transporting unit 430. The speed of the transporting unit 430 can be automatically adjusted to a suitable value in accordance with the size of each piece of food placed at the feeding section, the shape of food, heating conditions of the heating unit 410, or cooling conditions of the cooling unit 420.

The food processing system 10 of the invention comprises the transporting unit 200 for transporting food through the freezing unit 100A and the freezing unit 100B after the food preprocessing (sterilization) unit 400. The transporting unit 200 can have the same configuration as the configuration of the transporting unit 430. The transporting unit 200 may be configured to be coupled to the transporting unit 430 or separated from the transporting unit 430.

When, for example, the transporting unit 430 or the transporting unit 200 such as a conveyor belt is constructed in a linear configuration that penetrates the heating unit 410, the cooling unit 420, the freezing unit 100A, and the freezing unit 100B, starting from the feeding section for washed and cut food to the loading entrance of food into the heating unit 410, inside of the heating unit 410, end of the cooling unit that is coupled to the heating unit 410, the other end of the cooling unit 420, end of the freezing unit 100A that is coupled to the cooling unit 420, inside of the freezing unit 100A, inside of the freezing unit 100B, the other end of the freezing unit 100B, and the discharge exit of the freezing unit 100B, food can be washed, cut, sterilized, and frozen in an integrated process with excellent efficiency. Food continuously moves inside the heating unit 410 or freezing unit 100B without stagnation in such an integrated process. As a result, a constant amount of food can be processed and/or sterilized and/or frozen per unit time, enabling stable and efficient food processing and/or continuous sterilization and/or freezing.

(Administrative Unit)

The food freezing system 1 and/or the food processing system 10 may comprise an administrative unit. The administrative unit can receive information transmitted from each constituent element of the food freezing system 1 and/or the food processing system 10, and/or transmit information for controlling to each constituent element of the food freezing system 1. The administrative unit can monitor internal conditions of the first freezing unit 100A and/or second freezing unit 100B and/or heating unit 410 and/or cooling unit 420 and control these constituent elements to prevent processing conditions to be different from expectations (e.g., a temperature that is different from expectation).

The administrative unit may be provided integral with the food freezing system 1 and/or the food processing system 10 or at a remote location. In a certain embodiment, an administrative unit displays received information or information calculated from such information to an operator, and transmits control information to each constituent element of the food freezing system 1 and/or the food processing system 10 in accordance with an input of the operator. In a certain embodiment, an administrative unit utilizes received information or information calculated from such information to automatically transmit control information to each constituent element of the food freezing system 1 and/or the food processing system 10.

In an embodiment of the food freezing system 1 and/or the food processing system 10 comprising an administrative unit, conditions of each site (e.g., internal temperature of the first freezing unit 100A, internal temperature of the second freezing unit 100B, internal temperature, internal humidity, volume of water passing through, and amount of heat mediating substance such as steam released of the heating unit 410, internal temperature of the cooling unit 420, etc.) are preferably sent to the administrative unit external to an apparatus upon operation of the food freezing system 1 and/or the food processing system 10. Each data can be monitored with a monitor or the like at the administrative unit. The difference between a pre-registered optimal value and actual measurement values that are continuously inputted is calculated and evaluated to automatically display a warning, adjust each condition, or the like with a computer at the administrative unit. Thus, the food freezing system 1 and/or the food processing system 10 can be continuously operated for 24 hours with a small number of operators near the apparatus and at the administrative unit. Since the food freezing system 1 and/or the food processing system 10 can be operated without an experienced operator, products with consistent quality can be produced in a large quantity, regardless of where the system is located.

Figure 5:
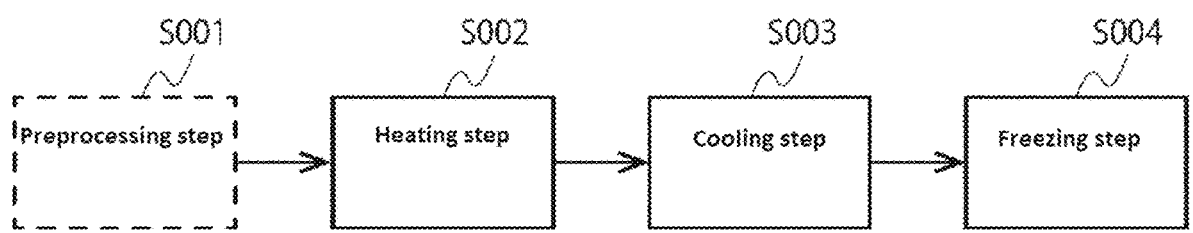
FIG. 5 shows an example of a flow of the method of producing food of the invention.

FIG. 5 shows an example of a flow of the method of producing food of the invention. Each step shown in FIG. 5 is described hereinafter.

Step S001: Preprocessing Step

Food is preprocessed at step S001. A preprocessing step comprises a step of washing food and/or a step of cutting food. A common method of washing and cutting vegetables, fruits, fish, or meat can be used without any limitation for washing and cutting food. In this manner, food provided to the heating unit 410 of a food freezing system can be washed and/or cut food. Step S001 may also be omitted.

In a certain embodiment, when relatively large food is used, skin, seeds, bones, and other nonedible portions are removed from the food, and the food is washed with water and cut into a suitable size and shape for the food in a preprocessing step. When relatively small food is used, the food is used in the next step without cutting. When food is vegetables, the vegetables can be cut into a shape similar to, for example, cut vegetables. Cherry tomatoes and strawberries only need to be washed with water, requiring no cutting. Radishes and carrots can be cut in a regular shape such as thinly shredded strips, short strips, or quarter circles. For bean sprouts, mushrooms, mesclun greens, and other small vegetables, it is preferable to remove inedible portions, but there is no need to cut them into smaller pieces. The order or frequency of washing and cutting is not particularly limited, as long as dust and dirt and inedible portions are complete removed and a suitable shape and size matching the food are attained after the preprocessing step. It is desirable to cut and wash in the shortest amount of time possible for cost and freshness retention reasons.

The preprocessing step generally uses a washing apparatus using a shower or a water tank and a cutting apparatus using a cutter, grinder, sieve, or the like. Washing apparatuses and cutting apparatuses that are commonly used in processing facilities of vegetables, fruits, mushrooms, fish, or meat can be used as such apparatuses.

Step S002: Heating Step

Step S002 and the subsequent step S003 are performed in the preprocessing (sterilization) unit 400.

Food is heated at step S002. The step of heating food can be a step of indirectly heating food. The food, while passing through the heating unit 410, is heated, for example, for 1 to 8 minutes and preferably for 1 minute to 3 minutes. The heating time can be changed by adjusting the speed of transporting unit.

The heating step can be in a form of a combination of various heating times and temperatures. For example in a certain embodiment, root vegetables are heated for 3 to 7 minutes at 75 to 90° C. In another embodiment, leafy vegetables are heated for 1 to 3 minutes at 60 to 75° C. In still another embodiment, fruit vegetables are heated for 1 to 3 minutes at 45 to 75° C. In still another embodiment, animal derived food is heated for 3 to 8 minutes at 75 to 90° C.

For example, in one embodiment of the present invention, a heating step transports washed and cut food to an end of the heating unit 410 whose internal temperature is maintained at a predetermined constant temperature in the range of 45° C. to 90° C., and then generates convection with an optionally installed fan inside a stem heater, and transports the food inside the heating unit 410 over 1 minute to 8 minutes while blowing air onto the surface of the food thereby to raise the temperature of the food. Food can be heated without exposure to outside air in the heating step.

Step S003: Cooling Step

Food is cooled at step S003. Preferably, the step of cooling food is a step of directly cooling food.

In some embodiments, the cooling unit 420 preferably comprises an air blowing mechanism and rapidly cools heated food by applying cold air to the food using the air blowing mechanism. This can maintain the surface and inside of the food in a state where microbe proliferation is suppressed. Since food passes through a temperature zone (e.g., about 20 to 40° C.) where microbes readily proliferate during the process of cooling, it is desirable to rapidly cool food to, for example, the chilled zone (e.g., about 2° C.).

While passing through the cooling unit 420 (for example, for about 2 to 8 minutes, preferably about 2 minutes to 5 minutes, and more preferably about 2 minutes to about 4 minutes), food is cooled. In a representative embodiment, cooling time can be adjusted by changing the length of the cooling unit 420 in accordance with the transport speed that has been set for adjusting heating time in the heating step, or the temperature of the cooling unit 420 or the air blowing strength of an air blowing mechanism can be set so that food is sufficiently cooled. In another embodiment, cooling time can be changed by adjusting the speed of the transporting unit.

The temperature inside the cooling unit 420 is not limited, but can be about −10° C. to about −40° C., about −10° C. to about −35° C., about −10° C. to about −30° C., or the like. Although not wishing to be bound by any theory, a temperature of food as of the end of the cooling step exceeding about 10° C. may entail a risk of microbes proliferating during subsequent processes. The temperature of food immediately after the cooling step is not limited, but is preferably about 5° C. or lower, still preferably about 1° C. to about 4° C., and more preferably about 2° C.

In a certain embodiment, the time period during which food is in the cooling unit 420 is about 2 to about 8 minutes, preferably about 2 to about 5 minutes, and more preferably about 2 to about 4 minutes. The cooling time is appropriately adjusted depending on the thermal conductivity of food and the size of cut food. The temperature from the surface to the center portion of food upon exiting the cooling unit 420 has decreased to about 5° C. to about −40° C., and preferably about 2° C. to about −20° C. With such a setting of the temperature and time, the cooling step rapidly decreases the temperature of the entire food to a low temperature region where microorganisms do not readily proliferate, and maintains the temperature at such a low temperature region.

In one embodiment, the cooling step can be a rapid cooling step for transporting food that has completed the heating step to an end of the cooling unit 420 maintained at a predetermined internal temperature in the range of about −10° C. to about −40° C. without exposing the food to outside air and then transporting the food inside the cooling unit 420 over about 2 to about 8 minutes to cool the food. Food is also cooled without being exposed to outside air in the cooling step.

Proliferation of microbes on the food surface and deterioration in quality of the inside of the food during food processing can be minimized by carrying out the heating step to the cooling step in the shortest possible time. A cooling step is not necessarily required. The process may transition to the following freezing step immediately after heating in the intermediate temperature zone.

Step S004: Freezing Step

Step S004 is performed in the food freezing system 1.

At step S004, food is frozen quickly (in about 5 to about 6 minutes). Preferably, the step of freezing food is a step of directly freezing food.

In some embodiments, a freezing unit preferably comprises an air blowing mechanism and quickly freezes cooled food by applying cold air to the food using the air blowing mechanism. This allows long term storage by maintaining the surface and inside of cooled food in a state where microbe proliferation is suppressed.

While passing through the first freezing unit 100A and the second freezing unit 100B (e.g., for about 6 minutes or less, preferably about 4 to about 6 minutes, and more preferably about 5 minutes to about 6 minutes), food is quickly frozen. In a representative embodiment, freezing time can be adjusted by changing the lengths of each of the freezing unit 100A and the freezing unit 100B in accordance with the transport speed that has been set for adjusting heating time in the heating step or the transport speed that has been set for adjusting the cooling time in the cooling step, or the temperature of the first freezing unit 100A and the second freezing unit 100B or the air blowing strength of an air blowing mechanism can be set so that food is sufficiently quick-frozen. In another embodiment, freezing time can be changed by adjusting the speed of the transporting unit.

Food can be frozen under various freezing conditions in a freezing step. Freezing conditions are associated with, for example, the shape, size (length), number, or internal temperature of the first freezing unit 100A and the second freezing unit 100B, air blowing strength of an air blowing mechanism, air blowing orientation of an air blowing mechanism, presence/absence of an air curtain generating mechanism (or number of air curtain generating mechanisms), air blowing strength of an air curtain generating mechanism, type of food, size of food, thermal conductivity of food, or water content of food. The present invention relates to a freezing technology for freezing food with cell membranes without destroying the cell membranes. Thus, unprocessed food ("raw" vegetables, fish, shellfish, or meat that is simply harvested) whose cell membranes are not destroyed and food processed without destroying cell membranes as shown in FIG. 4 benefit from the freezing technology of the invention, but there is no advantage for common processed food items subjected to processing that destroys cell membranes in the processing step. In this regard, processing that destroys cell membranes is, for example, heat sterilization by blanching. Blanching sterilizes vegetables, fruits, or the like by heat using hot water or high temperature steam. Since the processing temperature is in the temperature zone that destroys cell membranes, cells membranes are destroyed by processing prior to freezing. Thus, even if food is subjected to processing that preserves the cell membranes by the food freezing system of the invention in the freezing stage, the significance of the effect thereof is greatly diminished. Freezing conditions may be changed depending on each step prior to the freezing step (e.g., depending on the heating conditions in the heating step and/or cooling conditions in the cooling step).

For example, food can be frozen under uniform freezing conditions regardless of the type of food or the like. This eliminates the need for changing the freezing conditions to allow implementation of the freezing step in a time efficient manner. Alternatively, food can be frozen, for example, under different freezing conditions for each type of food. This allows use of a freezing approach that matches the type of food, which makes is possible to provide higher quality frozen food than under a uniform freezing condition.

The food preprocessing (sterilization) unit 400 does not apply chemical processing with a processing agent such as a water retaining agent or a thickener, or physical processing such as compression or pressing, but instead simply processes food under a relatively moderate condition in the heating unit 410. However, the food quality surprisingly improves by such heating. First, the temperature is maintained at 45° C. to 90° C. for a certain amount of time in the heating unit 410 to inactivate enzymes contained in fruits and vegetables and suppress self-deterioration/self-degradation of food. For this reason, fruits and vegetables that have been processed in the food preprocessing (sterilization) unit 400 maintain excellent mouthfeel with minimal discoloration, deformation, and outflow of fruit and vegetable juice, even when stored at room temperature for several days or longer. In contrast, room temperature storage of commercially available fresh fruits and vegetables for several days tends to result in discoloration, deformation, and outflow of fruit and vegetable juice, so that the fruits and vegetables would no longer be suitable for raw consumption.

In this manner, the food preprocessing (sterilization) unit 400 suppresses outflow of food content or drying of food items. Thus, yield from raw material food to final processed food items is high. Compared to conventional production of dishes or dried vegetables that have been cooked at a high temperature using hot water or hot air, processed food items obtained at an unloading section of the food preprocessing (sterilization) unit 400 have been empirically revealed as having improvement in yield for raw material food to final processed food items by 10% or more.

Tissue of fresh food does not deteriorate while the hardness or softness unique to fresh food is maintained by processing the food at a relatively low temperature in the heating unit 410. It is noteworthy that an unpleasant taste component (so-called harshness) contained in food is eliminated by the processing at the heating unit 410. For this reason, when the food is fruits and vegetables that are consumed raw, fresh processed vegetables with mouthfeel and rich taste of fresh vegetables are provided. Such processed vegetables have a quality that is absent in conventional cut vegetables or cut fruits. When the food is seafood, mushrooms, or other food that is rich in umami or fragrance, there is an effect of further enriching the umami or fragrance of the food or maintaining the smooth sensation of fresh food.

The food freezing system of the invention can maintain the aforementioned excellent conditions of food for a long period of time without compromising the conditions by quick-freezing such food maintained in excellent conditions described above through processing by the food preprocessing (sterilization) unit 400 under various freezing conditions described above. This can dramatically reduce the amount of food waste, and consumers can consume food in better conditions at a lower cost.

The inventors surprisingly found that cell membranes can be destroyed even when food is quick-frozen if the food is frozen without preprocessing at the intermediate temperature zone (45° C. to 90° C.). Although not intending to be bound by any theory, it is understood that cell membranes of food changed to have resistance to heat by preprocessing the food at the intermediate temperature zone (45° C. to 90° C.) prior to freezing.

For frozen food prepared by conventional technologies, nutrients of the food were on average 40% by weight or less after thawing due to destruction of cell tissue during freezing/thawing. Meanwhile, components and nutrients that are intrinsic to the food are maintained as is without destroying cell membranes after thawing by using the freezing technology of the invention. Thus, food reserve can be deemed to have improved by 60%. In view of the imminent food shortages, the present invention can also provide a solution for such food shortages.

(Food)

Preferred examples of food for the freezing system of the invention include cut vegetables and cut fruits. Preferred examples of food for the freezing system of the invention include vegetables such as broccoli, cauliflower, spinach, carrot, potato, lotus root, cabbage, napa cabbage, and tomato, fruits such as pineapple, mango, and apple, meat such as chicken, pork, and beef, and fish and shellfish such as crab, shrimp, and scallop. However, cells of food that has been processed by simmering, broiling, boiling, or the like, and food that has been preprocessed by heating such as blanching (excluding processing at the preprocessing (sterilization) unit of the invention) are already destroyed. Thus, significance of care to avoid destroying cells of food using the freezing system of the invention would be diminished for such food. Preferred examples of food for the freezing system of the invention include food processed in the preprocessing (sterilization) unit of the invention (food whose cells are not destroyed) and food that has not been processed by simmering, broiling, boiling, or the like. Meanwhile, cell membranes are not destroyed by processing in the intermediate temperature zone described above, so that food can benefit from the freezing processing of the invention.

The present invention has been described while showing preferred embodiments to facilitate understanding. While the present invention is described hereinafter based on the Examples, the above descriptions and the following Examples are provided for the sole purpose of exemplification, not limitation of the present invention. Thus, the scope of the present invention is not limited to the embodiments and Examples that are specifically described herein and is limited only by the scope of claims.

EXAMPLES

Example 1

Vegetables (broccoli, cauliflower, spinach, carrot, etc.) were cut into a predetermined size and then preprocessed in the food preprocessing (sterilization) unit of the invention (FIG. 4). The post-thawing conditions of these preprocessed cut vegetables that were frozen using the food freezing system of the invention were compared to those of such vegetables frozen by a conventional freezing method. Table 1 shows the results of comparison.

ing temperature (about −196° C.). Since freezing using a freezer, IQF, or the like requires a long period of time (about 10 minutes or more) for reaching a temperature of −5° C. at the center of food, the temperatures are different between the surface and the core of the food. Thus, an increase in frozen mass within cell membranes cannot be inhibited. It is understood that cell membranes were damaged significantly at the core of food relative to the food surface as a result thereof to induce syneresis (component outflow) upon thawing.

Example 2

Cell tissue of broccoli subjected to various processing was observed under a microscope after placing thinly sliced food on a slide glass in parallel, adding a droplet of stain to the food, and covering the food with a transparent glass sheet at the Industrial Technology Center of Okayama Prefecture.

Figure 12A:
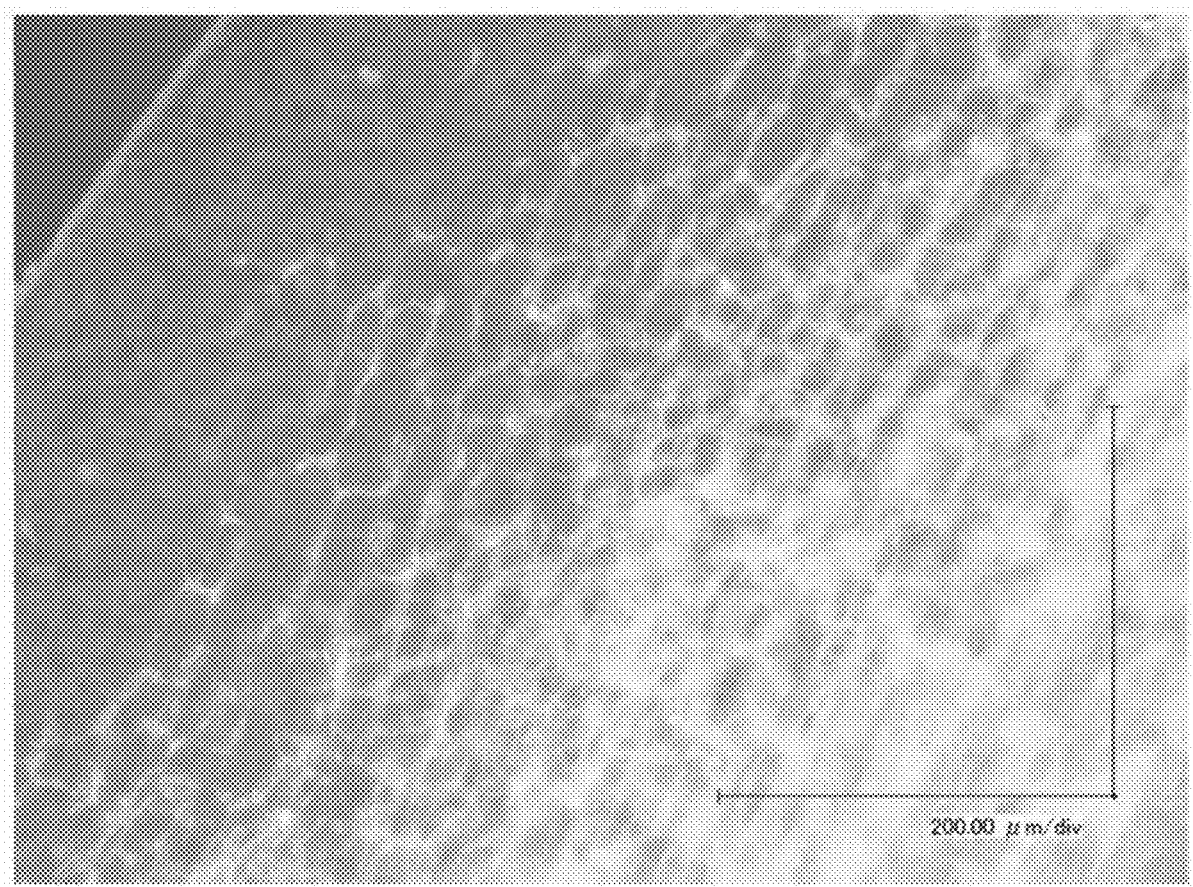
FIG. 12A shows a 500× microscope picture of unprocessed raw broccoli.

First, a 500× microscope picture of unprocessed raw broccoli is shown in FIG. 12A. It can be seen that cell tissue solidly remains without damage.

Figure 12B:
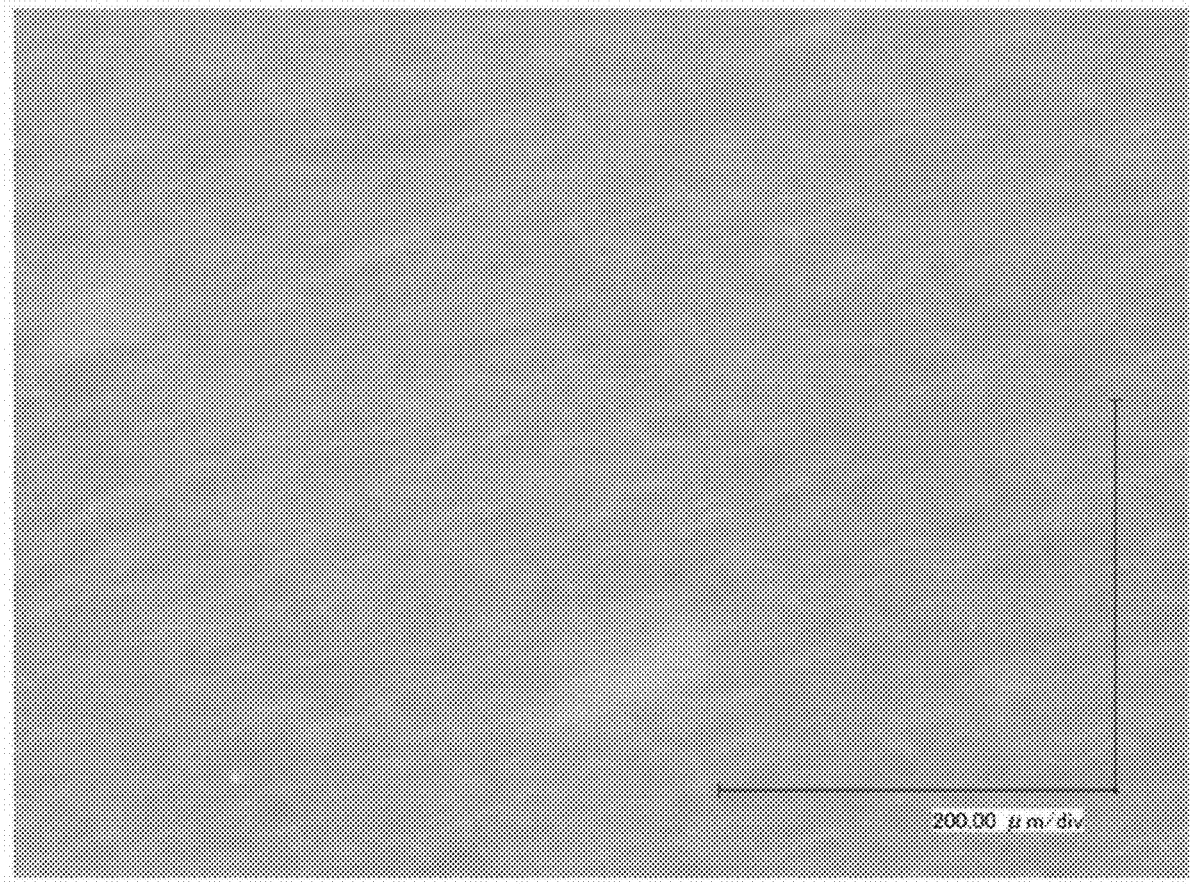
FIG. 12B shows a 500× microscope picture of broccoli after preprocessing in the food preprocessing (sterilization) unit (FIG. 4).

FIG. 12B shows a 500× microscope picture of broccoli after preprocessing in the intermediate temperature zone (about 88° C.) in the food preprocessing (sterilization) unit of the invention (FIG. 4). It was confirmed from the shape of cell membranes that cell tissue sufficiently remained without destruction.

Next, a 500× microscope picture of broccoli whose tissue shown in FIG. 12B was frozen (by randomly blowing out cold air from an air blowing vent) in 5 minutes at −60° C.

TABLE 1

| | Freezing method | Processing time | Result after 3 hours of thawing at room temperature | Evaluation |
| --- | --- | --- | --- | --- |
| Examples | Food freezing system of the invention | 5 minutes | Hardly any destruction of cells or syneresis from food ingredient was observed. Taste and mouthfeel were unchanged from those prior to thawing, and hardly any decrease in nutritional value was found. | ○ |
| Comparative Example 1 | Direct spraying of liquid nitrogen | 3 minutes | Significant damage to cells and syneresis from food ingredient were observed. Significant deterioration was found in taste and mouthfeel compared to those prior to freezing | x |
| Comparative Example 2 | Freezer (−35° C. to 45° C.) | 10 to 15 minutes | Same as above | x |
| Comparative Example 3 | IQF (Individual Quick Freezer) | 10 to 15 minutes | Same as above | x |
| Comparative Example 4 | Batch instant freezer | 15 to 20 minutes | Same as above | x |

As shown in Table 1, vegetables processed with the food freezing system of the invention maintained mouthfeel and taste such as texture that are unique to vegetables prior to freezing without syneresis (component outflow) upon thawing. In contrast, syneresis (component outflow) occurred upon thawing, and mouthfeel and taste deteriorated for vegetables processed with a conventional freezing method.

Figure 12C:
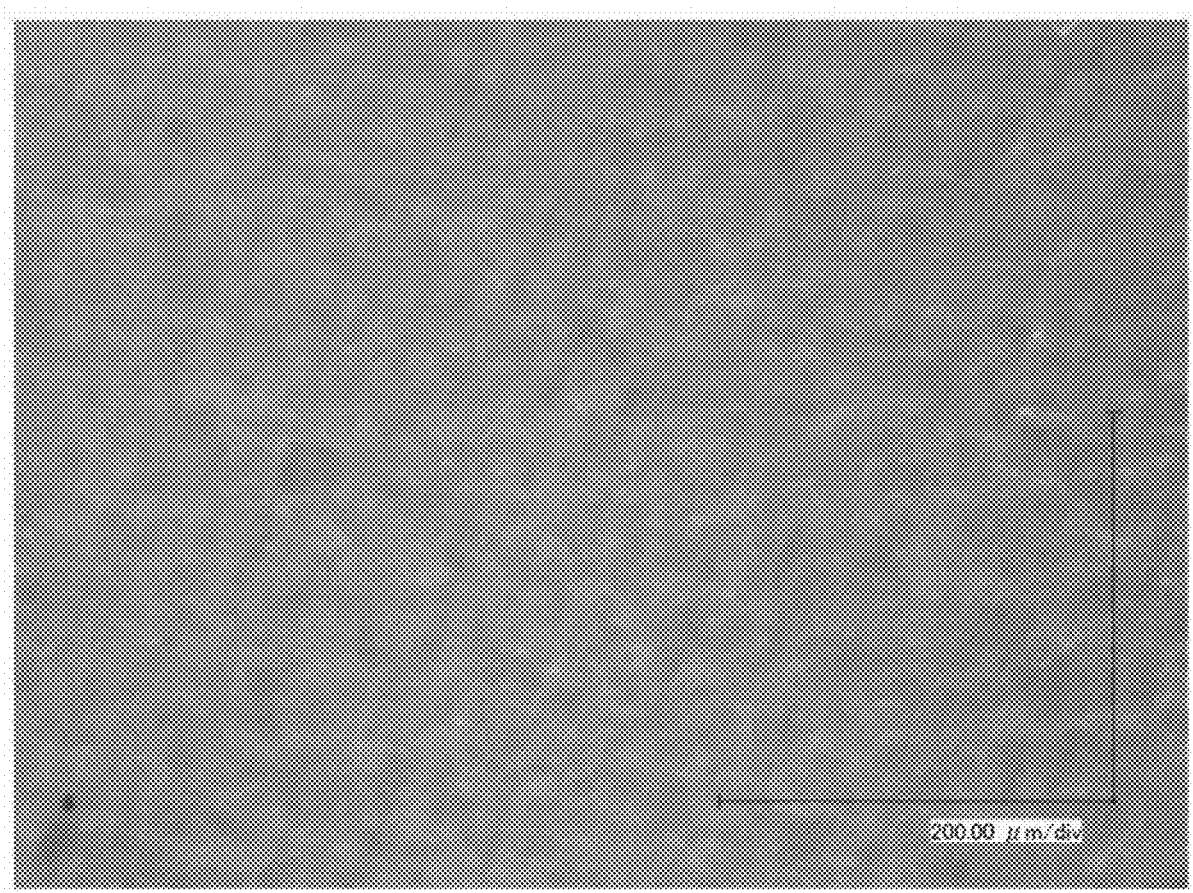
FIG. 12C shows a 500× microscope picture of broccoli whose tissue shown in FIG. 12B was frozen at −60° C. in 5 minutes and then thawed.

It is understood that freezing with liquid nitrogen results in damage to cell membranes in view of the breakdown in the balance in the relationship between contraction of fiber in food and swelling of moisture due to a very low processand then thawed is shown in FIG. 12C. Surprisingly, it was confirmed from the shape of cell membranes that cell tissue sufficiently remained without destruction.

Figure 12D:
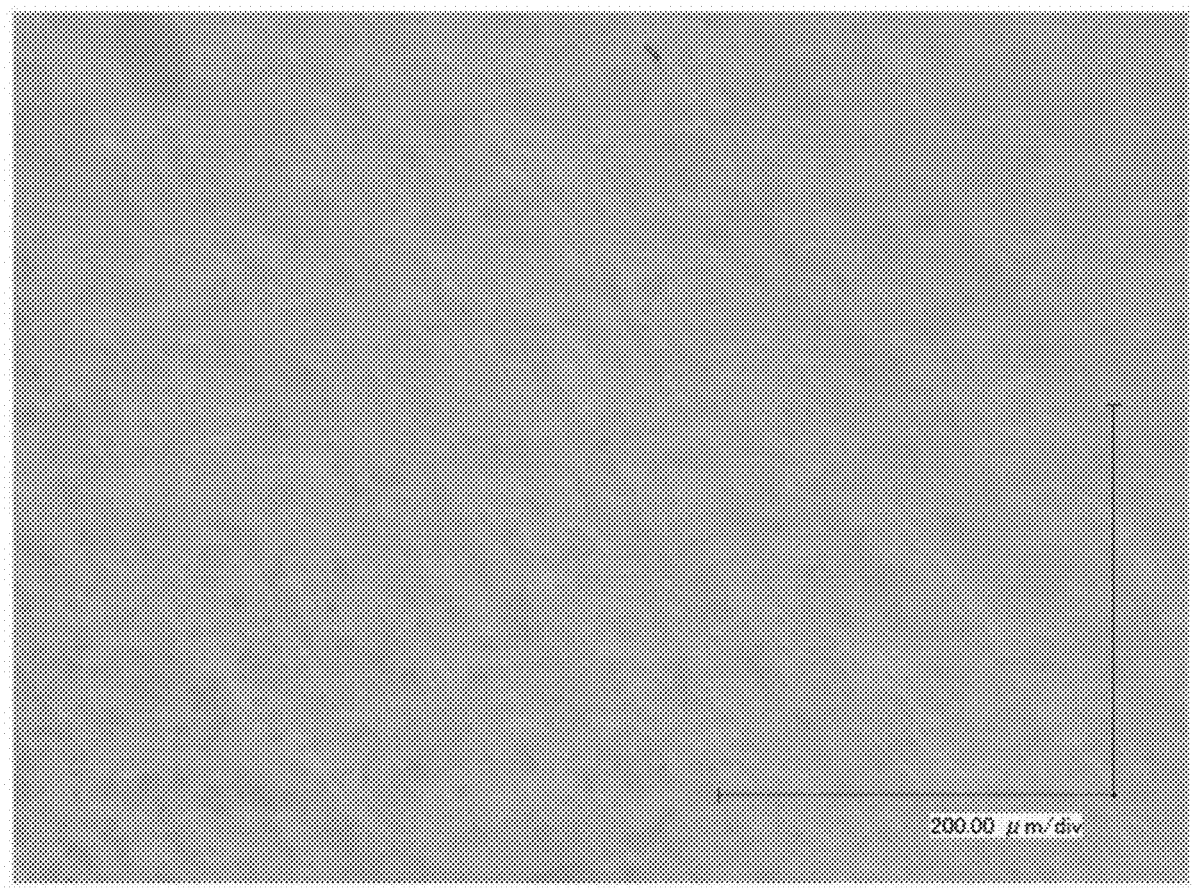
FIG. 12D shows a 500× microscope picture of broccoli whose tissue shown in FIG. 12B was frozen at −35° C. to −45° C. over 15 to 20 minutes and then thawed.

A 500× microscope picture of broccoli whose tissue shown in FIG. 12B was frozen at −35° C. to −45° C. over 15 to 20 minutes and then thawed is shown in FIG. 12D. It can be seen that unlike FIG. 12C, only cells in the direction of fiber remain without destruction, and the rest is destroyed.

Destruction of cell tissue was found in food that were not preprocessed in the intermediate temperature zone even when frozen at −60° C. in 5 minutes (not shown), unlike the results in FIG. 12C. Although not intending to be bound by any theory, it is understood that an excellent freezing technology was created, with which cell tissue remains without destruction even after thawing from preprocessing in the intermediate temperature zone of the invention, resulting in some type of a change in the structure so that cell tissue would have resistance to heat, combined with freezing at −60° C. or below for 5 minutes or less.

INDUSTRIAL APPLICABILITY

The present invention is useful as an invention providing a food freezing system resulting in reduced syneresis after thawing compared to conventional frozen food, and a method of producing frozen food using such a food freezing system.

REFERENCE SIGNS LIST

1 Food freezing system
10 Food processing system
100A First freezing unit
100B Second freezing unit
200 Transporting unit
300 Air curtain generating mechanism
400 Food preprocessing (sterilization) unit
410 Heating unit
420 Cooling unit
430 Transporting unit

The invention claimed is:

1. A food freezing system for freezing food, the food freezing system comprising:
   freezing units for freezing the food; and
   a transporting unit for transporting the food to the two or more freezing units;
   wherein the freezing units comprise a plurality of air blowing vents for blowing cold air toward the transporting unit along a direction of transport of the transporting unit,
   wherein the air blowing vent is provided at least at either a lower portion or an upper portion of the transporting unit, and is tilted with respect to a direction that is orthogonal to the direction of transport of the transporting unit, and
   wherein orientations of tilts of the air blowing vents are configured to alternate along the direction of transport of the transporting unit.

2. The freezing system according to claim 1, wherein an orientation of the air blowing vents is configured to be an orientation against the direction of transport of the transporting unit.

3. The food freezing system according to claim 1, wherein the orientation of the air blowing vents is against the direction of transport of the transporting unit and is tilted at an angle of about 30° to about 60°.

4. The food freezing system according to claim 1, wherein the air blowing vents are provided at a lower portion of the transporting unit.

5. The food freezing system according to claim 1, wherein the air blowing vents are provided at both an upper portion and a lower portion of the transporting unit.

6. The food freezing system according to claim 5, wherein
   the air blowing vent at the upper portion is provided so as to be tilted in a first direction that intersects a direction that is orthogonal to the direction of transport of the transporting unit, and
   the air blowing vent at the lower portion is provided so as to be tilted in a second direction that intersects the first direction.

7. The food freezing system according to claim 1, wherein the transporting unit is configured to transport the food so that the food passes through the freezing units within about 6 minutes from entering the food freezing system.

8. A food processing system, comprising:
   (1) a heating unit comprising a heating mechanism for indirectly heating food; and
   (2) the food freezing system according to claim 1;
      wherein the transporting unit transports the food through the heating unit and the food freezing system.

9. The food processing system according to claim 8, wherein the heating mechanism is present only below the transporting unit and is configured to release a heat mediating substance downward, and the heating unit comprises an air blowing mechanism configured to blow air in a direction that is not toward the transporting unit.

10. The food processing system according to claim 9, wherein the heating unit comprises a temperature sensor in the vicinity of the transporting unit, and the heating mechanism is intermittently driven by the temperature sensor.

11. A method of producing frozen food, comprising a processing step for freezing food using the food processing system according to claim 8.

12. The method of producing according to claim 11, wherein the food is cut vegetables or cut fruit.

13. The method of producing according to claim 11, wherein the food is vegetables, meat, fish, or shellfish.

14. A method of producing frozen food, comprising a processing step for freezing food using the food freezing system according to claim 1.

15. The method of producing according to claim 14, wherein the food is cut vegetables or cut fruit.

16. The method of producing according to claim 14, wherein the food is vegetables, meat, fish, or shellfish.

* * * * *